(12) United States Patent
Sant'Anna et al.

(10) Patent No.: US 12,447,770 B2
(45) Date of Patent: Oct. 21, 2025

(54) VEHICLE WHEEL DISC, VEHICLE WHEEL INCLUDING SUCH A WHEEL DISC AND METHOD FOR PRODUCING SUCH A WHEEL DISC AND VEHICLE WHEEL

(71) Applicant: Maxion Wheels Holding GmbH, Königswinter (DE)

(72) Inventors: Adriano Phoenix Sant'Anna, Pocos de Caldas (BR); Marcio Aparecido de Oliveira, Limeira (BR); Renato de Jesus Madeira, Vinhedo (BR); Alexandre André Costa Motta, Sao José do Alegre (BR); Marcelo Yumoto Graziani, Limeira (BR); Ralf Duning, Solingen (DE); Iosef Fanizza, Königswinter (DE)

(73) Assignee: Maxion Wheels Holding GmbH, Konigswinter (DE)

( * ) Notice: Subject to any disclaimer, the term of this patent is extended or adjusted under 35 U.S.C. 154(b) by 748 days.

(21) Appl. No.: 17/686,803

(22) Filed: Mar. 4, 2022

(65) Prior Publication Data

US 2023/0278365 A1    Sep. 7, 2023

(51) Int. Cl.
*B60B 3/00* (2006.01)
*B60B 3/16* (2006.01)

(52) U.S. Cl.
CPC .............. *B60B 3/007* (2013.01); *B60B 3/008* (2013.01); *B60B 3/16* (2013.01);
(Continued)

(58) Field of Classification Search
CPC ........... B60B 3/007; B60B 3/008; B60B 3/16; B60B 3/04; B60B 2360/102; B60B 2900/111; B60B 2900/513
See application file for complete search history.

(56) References Cited

U.S. PATENT DOCUMENTS

| 1,650,780 A | 11/1927 | Erastus |
| 3,627,382 A | 12/1971 | Lejeune |
| (Continued) | | |

FOREIGN PATENT DOCUMENTS

| CN | 107685589 A | * | 2/2018 |
| DE | 10156086 B4 | | 9/2006 |
| (Continued) | | | |

OTHER PUBLICATIONS

Translation of CN 107685589 A, 5 pages (Year: 2018).*

(Continued)

*Primary Examiner* — S. Joseph Morano
*Assistant Examiner* — Emily G. Castonguay
(74) *Attorney, Agent, or Firm* — MacMillan, Sobanski & Todd, LLC

(57) ABSTRACT

A full face fabricated vehicle wheel having a wheel attached to a wheel disc. The wheel disc includes a hub located centrally within the wheel disc and defining a wheel axis. The wheel disc further includes an outer circumferential edge having an outboard bead seat retaining flange, and an annular transition portion radially extending between the hub and the outer circumferential edge. The transition portion includes a plurality of vent hole regions circumferentially spaced around the transition portion about the wheel axis. At least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region.

32 Claims, 18 Drawing Sheets

(52) U.S. Cl.
CPC ... *B60B 2310/224* (2013.01); *B60B 2360/102* (2013.01); *B60B 2900/111* (2013.01); *B60B 2900/513* (2013.01)

(56) References Cited

U.S. PATENT DOCUMENTS

| | | | |
|---|---|---|---|
| 3,823,591 | A | 7/1974 | Schroder et al. |
| 4,134,284 | A | 1/1979 | Nitschke |
| 5,295,304 | A | 3/1994 | Ashley |
| 5,435,632 | A | 7/1995 | Gajor et al. |
| 5,533,261 | A | 7/1996 | Kemmerer |
| 5,577,810 | A | 11/1996 | Abe et al. |
| 5,651,590 | A | 7/1997 | Word |
| 5,694,687 | A | 12/1997 | Coleman |
| 6,332,653 | B1 * | 12/2001 | Shimizu ............... B60B 3/005 301/63.101 |
| 6,473,967 | B1 | 11/2002 | Coleman et al. |
| 6,546,629 | B2 | 4/2003 | Politi |
| 2004/0227392 | A1 * | 11/2004 | Coleman ............... B60B 3/002 301/63.101 |
| 2012/0291283 | A1 | 11/2012 | Ikeda et al. |
| 2015/0001913 | A1 * | 1/2015 | Abe ............... B21D 53/30 301/63.101 |
| 2017/0291447 | A1 | 10/2017 | Vorbeck et al. |
| 2018/0319209 | A1 | 11/2018 | Chung |
| 2020/0108435 | A1 | 4/2020 | Gotou et al. |

FOREIGN PATENT DOCUMENTS

| | | |
|---|---|---|
| DE | 102018220305 A1 | 5/2020 |
| EP | 0985552 A2 | 3/2000 |
| GB | 202888 A | 8/1923 |
| WO | 9425198 | 11/1994 |
| WO | 2019171159 A1 | 9/2019 |
| WO | 2015159231 A1 | 8/2022 |

OTHER PUBLICATIONS

International Search Report and Written Opinion, Application No. PCT/IB2023/051953, dated May 11, 2023.
PCT International Search Report and Written Opinion, Application No. PCT/IB2023/051964, dated Apr. 28, 2023.
PCT International Search Report and Written Opinion, Application No. PCT/IB2023/051962, dated May 2, 2023.
PCT International Search Report and Written Opinion, Application No. PCT/IB2023/051963, dated Apr. 28, 2023.
PCT International Search Report and Written Opinion, Application No. PCT/IB2023/051965, dated Apr. 28, 2023.
PCT International Search Report and Written Opinion, Application No. PCT/IB2023/051966, dated Apr. 28, 2023.

* cited by examiner

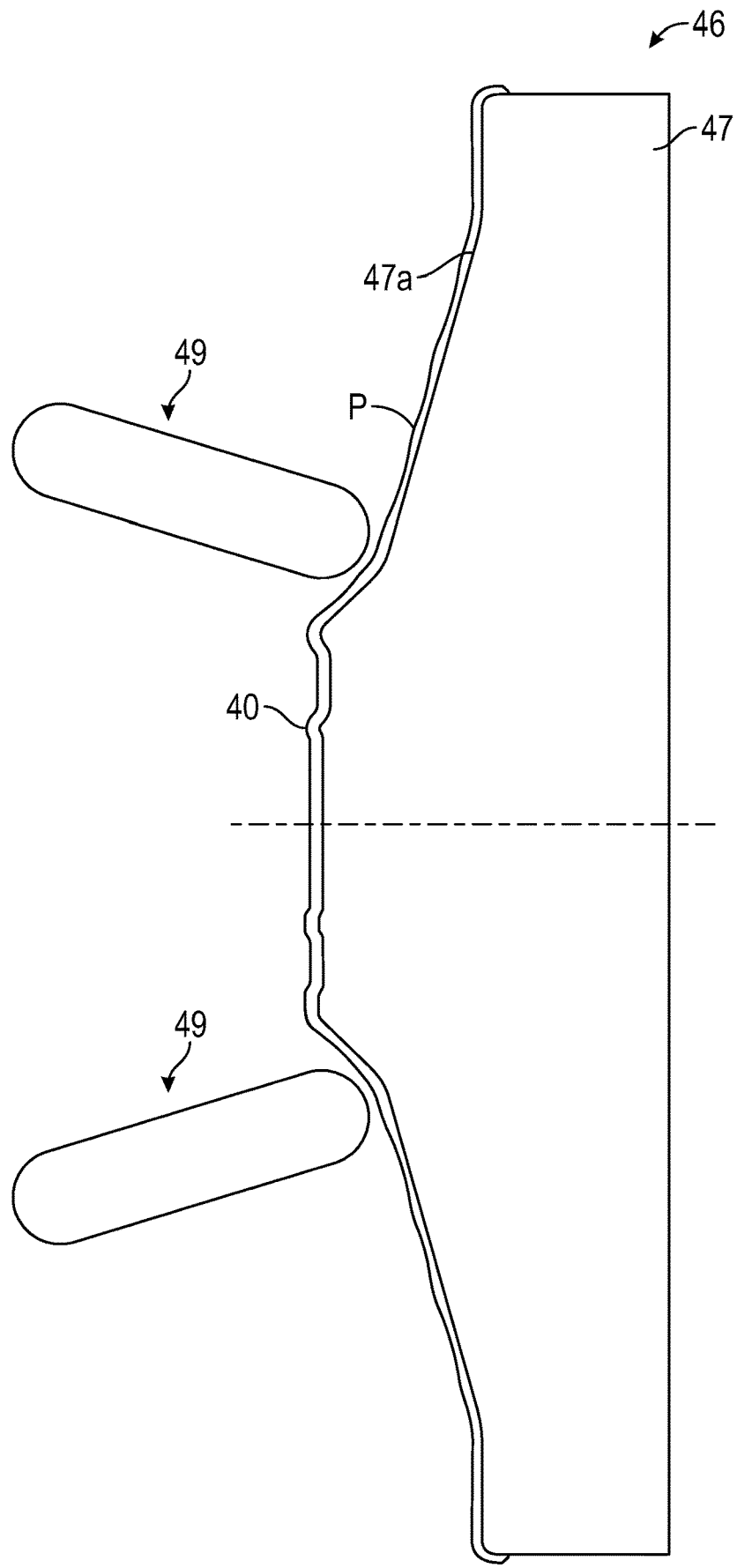

VEHICLE WHEEL DISC, VEHICLE WHEEL INCLUDING SUCH A WHEEL DISC AND METHOD FOR PRODUCING SUCH A WHEEL DISC AND VEHICLE WHEEL

BACKGROUND OF THE INVENTION

The present invention relates in general to a vehicle wheel disc and vehicle wheel and in particular to an improved wheel disc, vehicle wheel including such a wheel disc and method for producing such a wheel disc and vehicle wheel.

Wheels for automotive vehicles may be formed by joining multiple components together. For example, a wheel may consist of two formed steel parts joined together, such as by welding. One known conventional wheel includes a generally planar or circular wheel disc welded to an outer circumferential edge portion of an annular wheel rim. The wheel rim has a suitable annular shape for receiving and supporting a tire. The wheel disc includes a central hub portion that functions as a wheel mounting portion of the wheel for connecting with an axle via a plurality of lug bolts and lug nuts.

It is known to produce a wheel disc by a flow forming or flow turning process. In a flow forming process, a flow forming machine is used to form a circular steel blank into the desired shape of the wheel disc. For example, the steel blank may be clamped at a central region or hub area. The material of the disc extended radially outwardly from the hub is pressed and elongated by means of flow forming under rotation of the blank against a spinning chuck and/or other tools in order to obtain the desired contour. Conventional wheel discs which are made by flow forming or flow turning generally have uniform surfaces on their inner and outer sides of the wheel disc. This provides a wheel disc that can withstand the loads occurred thereon during operation of the vehicle upon which the wheel is mounted. Although such flow forming processes provide wheel discs having sufficient rigidity, it would be desirable to produce a wheel disc which optimizes the material usage of the wheel disc which may reduce the overall mass of the wheel disc.

SUMMARY OF THE INVENTION

The present invention relates to an improved wheel disc, vehicle wheel including such a wheel disc and method for producing such a wheel disc and vehicle wheel as illustrated and/or described herein.

According to one embodiment, a full face fabricated vehicle wheel may comprise, individually and/or in combination, one or more of the following features, elements, or advantages: a wheel rim and a wheel disc; the wheel rim has a tire well and an inboard bead seat retaining flange, wherein the wheel rim defines an outboard bead seat and an inboard bead seat; the wheel disc is configured to be secured to the wheel rim; the Wheel disc includes a hub located centrally within the wheel disc and defining a wheel axis; the hub includes an axial hub hole and a plurality of lug bolt receiving holes formed therein such that the lug bolt receiving holes are spaced circumferentially about the hub hole equidistant from one another; the wheel disc further includes an outer circumferential edge having an outboard bead seat retaining flange, and an annular transition portion radially extending between the hub and the outer circumferential edge; the transition portion includes a plurality of vent hole regions circumferentially spaced around the transition portion about the wheel axis; at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region.

According to this embodiment, the wheel rim and the wheel disc are made of steel.

According to this embodiment, the plurality of vent hole regions are circumferentially spaced equidistant from one another.

According to this embodiment, each vent hole region includes an identically shaped vent hole having at least two bridging portions.

According to this embodiment, a first number of the vent hole regions include a first vent hole, and wherein a second number of the vent hole regions include a second vent hole differently shaped than the first vent hole.

According to this embodiment, the number of lug bolt receiving holes is equal to the number of vent hole regions.

According to this embodiment, the vent hole regions are positioned radially adjacent to the lug bolt receiving holes.

According to this embodiment, the bridging portions are curved, or wherein the bridging portions are straight.

According to this embodiment, the at least one vent hole region includes a vent hole defining an outer perimeter such that two intersecting and crossing bridging portions extend inwardly from the perimeter forming an X-shape profile which subdivides the vent hole into four smaller holes formed through the transition portion at the at least one vent hole region.

According to this embodiment, the at least one vent hole region includes a vent hole defining an outer perimeter such that two or more parallel spaced bridging portions subdivides the vent hole into smaller holes.

According to this embodiment, the transition portion has an outboard surface and an inboard surface such that at least a portion of the transition portion has a variable thickness between the outboard and inboard surfaces along a radial direction.

According to this embodiment, at least one of the outboard and inboard surfaces of the transition portion has a plurality of concentric ring-shaped curvatures formed therein, thereby providing the transition portion with a variable thickness between the inboard and outboard surfaces.

According to this embodiment, one of the inboard and outboard surfaces of the transition portion has a relatively smooth profile.

According to this embodiment, the concentric ring-shaped curvatures include undulations formed in at least one of the outboard and inboard surfaces.

According to this embodiment, the undulations are formed as alternating convex and concave ring-shaped curves concentric about the wheel axis.

According to this embodiment, the transition portion is subdivided into a plurality of concentric segments.

According to this embodiment, the transition portion is divided into first, second, third, fourth, and fifth sequential segments extending radially outwardly from the wheel axis.

According to this embodiment, the first segment includes anywhere from zero to three ring-shaped curvatures, the second segment includes anywhere from zero to two ring-shaped curvatures, the third segment includes anywhere from one to twenty ring-shaped curvatures, the fourth segment includes anywhere from zero to two ring-shaped curvature, the fifth segment includes anywhere from zero to three ring-shaped curvatures.

According to this embodiment, the first segment has a maximum thinning of 40% of a thickness of the hub, the second segment has a maximum thinning of 40% of the thickness of the hub, the third segment has a maximum thinning of 60% of the thickness of the hub, the fourth segment has a maximum thinning of 40% of the thickness of the hub, and/or the fifth segment has a maximum thinning of 60% of the thickness of the hub.

According to this embodiment, at least the third segment includes undulations formed as alternating convex and concave ring-shaped curves concentric about the wheel axis in the inboard surface of the third segment.

According to this embodiment, the first segment is adjacent an outer edge of the hub and has a frustoconical shape sloped at a first angle relative to the wheel axis.

According to this embodiment, the third segment has a frustoconical shape sloped at a second angle relative to the wheel axis which is different from the first angle.

According to this embodiment, the second segment joins the first and third segments together with a curvature that smoothly blends in with the first and third segments, and wherein the fourth segment joins the third and fifth segments together with a curvature that smoothly blends in with the third and fifth segments.

According to this embodiment, an outboard surface of the fifth segment s generally planar and perpendicular to the wheel axis.

According to this embodiment, the transition portion includes the vent hole regions in at least the third segment.

According to this embodiment, the third segment has a radial length of about between 50 percent to about 70 percent of the radial length of the transition portion.

According to this embodiment, the transition portion further includes the vent hole regions in the first, second, or fourth segments.

According to this embodiment, the fifth segment extends radially outwardly from the fourth segment to the outer circumferential edge of the wheel disc.

According to this embodiment, the outer perimeter of the vent hole radially extends only in the third segment, or wherein the outer perimeter of the vent hole radially extends through the third and fourth segments, or wherein the outer perimeter of the vent hole radially extends through the second, third, fourth segments, or wherein the outer perimeter of the vent hole radially extends through the second and third segments.

According to another embodiment, a wheel disc configured for use in a full face fabricated vehicle wheel and may comprise, individually and/or in combination, one or more of the following features, elements, or advantages: a steel wheel disc having a hub located centrally within the wheel disc and defining a wheel axis, wherein the hub includes an axial hub hole and a plurality of lug bolt receiving holes formed therein such that the lug bolt receiving holes are spaced circumferentially about the hub hole equidistant from one another; an outer circumferential edge; and an annular transition portion radially extending between the hub and the outer circumferential edge, wherein the transition portion includes a plurality of vent hole regions circumferentially spaced around the transition portion about the wheel axis, and wherein at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region, and wherein the transition portion is divided into first, second, third, fourth, and fifth sequential segments extending radially outwardly from the wheel axis, wherein the first segment is adjacent an outer edge of the hub and has a frustoconical shape sloped at a first angle relative to the wheel axis, and wherein the third segment has a frustoconical shape sloped at a second angle relative to the wheel axis which is different from the first angle, and wherein the second segment joins the first and third segments together with a curvature that smoothly blends in with the first and third segments, and wherein the fourth segment joins the third and fifth segments together with a curvature that smoothly blends in with the third and fifth segments, and wherein the fifth segment extends radially outwardly from the fourth segment to the outer circumferential edge of the wheel disc, and wherein the vent holes are formed only in the third segment.

According to another embodiment, a method of manufacturing wheel disc may comprise, individually and/or in combination, one or more of the following steps features, elements, or advantages: (a) providing a metallic preform; (b) positioning the preform on a mandrel of a flow forming machine; and (c) flow forming the preform against the mandrel by a rolling tool to form a wheel disc having; a hub located centrally within the wheel disc and defining a wheel axis, wherein the hub includes an axial hub hole and a plurality of lug bolt receiving holes formed therein such that the lug bolt receiving holes are spaced circumferentially about the hub hole equidistant from one another; an outer circumferential edge having an outboard bead seat retaining flange; and an annular transition portion radially extending between the hub and the outer circumferential edge, wherein the transition portion includes a plurality of vent hole regions circumferentially spaced around the transition portion about the wheel axis, and wherein at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region.

Various aspects of this invention will become apparent to those skilled in the art from the following detailed description of the preferred embodiment, when read in light of the accompanying drawings.

BRIEF DESCRIPTION OF THE DRAWINGS

FIG. 24 is a schematic illustration of a flow forming machine schematically illustrating the process of flow forming a wheel disc preform.

DETAILED DESCRIPTION OF THE PREFERRED EMBODIMENTS

Figure 23:
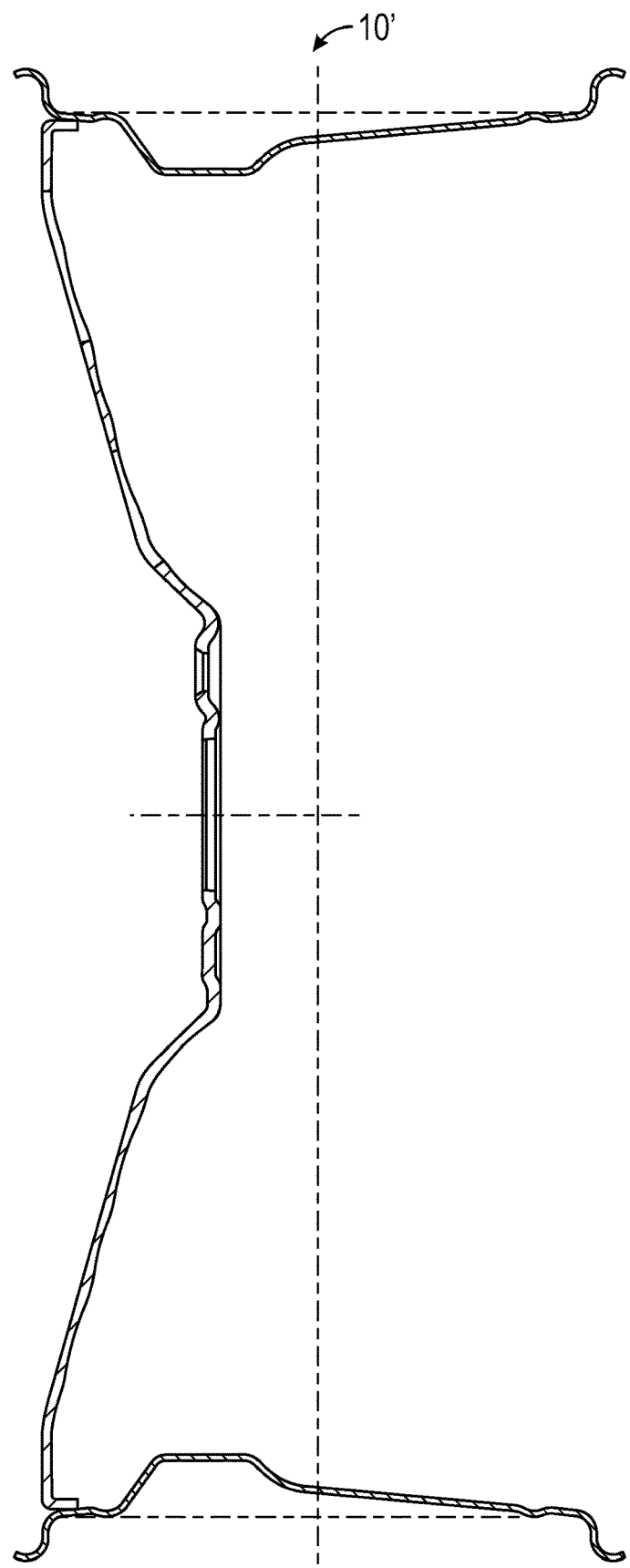
FIG. 23 is a cross-sectional view of another embodiment of vehicle wheel in accordance with this invention.

Referring now to the drawings, there is illustrated in FIGS. 1 through 6 a "full face" vehicle wheel, indicated generally at 10. The vehicle wheel 10 generally incudes an inner "full face" wheel disc, indicated generally at 12, and an annular outer "partial" wheel rim 14. Although the invention is illustrated and described in conjunction with the particular vehicle wheel construction disclosed herein, it will be appreciated that the invention can be used in conjunction with other types of "full face" vehicle wheel constructions and/or other types of vehicle wheel constructions. For example, the invention can be used in conjunction with a bead seat attached vehicle wheel 10', as shown in FIG. 23.

In a preferred embodiment (and as illustrated herein), the wheel disc 12 and the wheel rim 14 are produced separately and then joined together by any suitable means, such as by welding, to produce a fabricated full face vehicle wheel 10. In a preferred embodiment, the wheel disc 12 and the wheel rim 14 are made from steel and are then secured together, such as by a weld 16 (shown in FIG. 2), to form the wheel 10. Of course, the wheel disc 12 and/or the wheel rim 14 may be made of any suitable materials such as for example, aluminum, magnesium, titanium or alloys thereof, carbon fiber and/or composite materials and/or may be secured together by other suitable means, if so desired.

The combination of the wheel disc 12 and the wheel rim 14 defines a wheel axis X for the wheel 10. The wheel rim 14 can have any suitable annular shape for receiving and supporting a tire (not shown). The combination of the wheel disc 12 and the wheel rim 14 define a tire well, indicated generally at 15, preferably having a continuous annular shape relative to the wheel axis X for accommodating a vehicle tire (not shown) mounted thereon. It should be appreciated that the wheel rim 14 can have any desired diameter and/or shape. In a preferred embodiment, the wheel rim 14 has an outer diameter or a wheel diameter within the range of about 405 millimeters (about 16 inches), to about 560 millimeters (about 22 inches).

Figure 4:
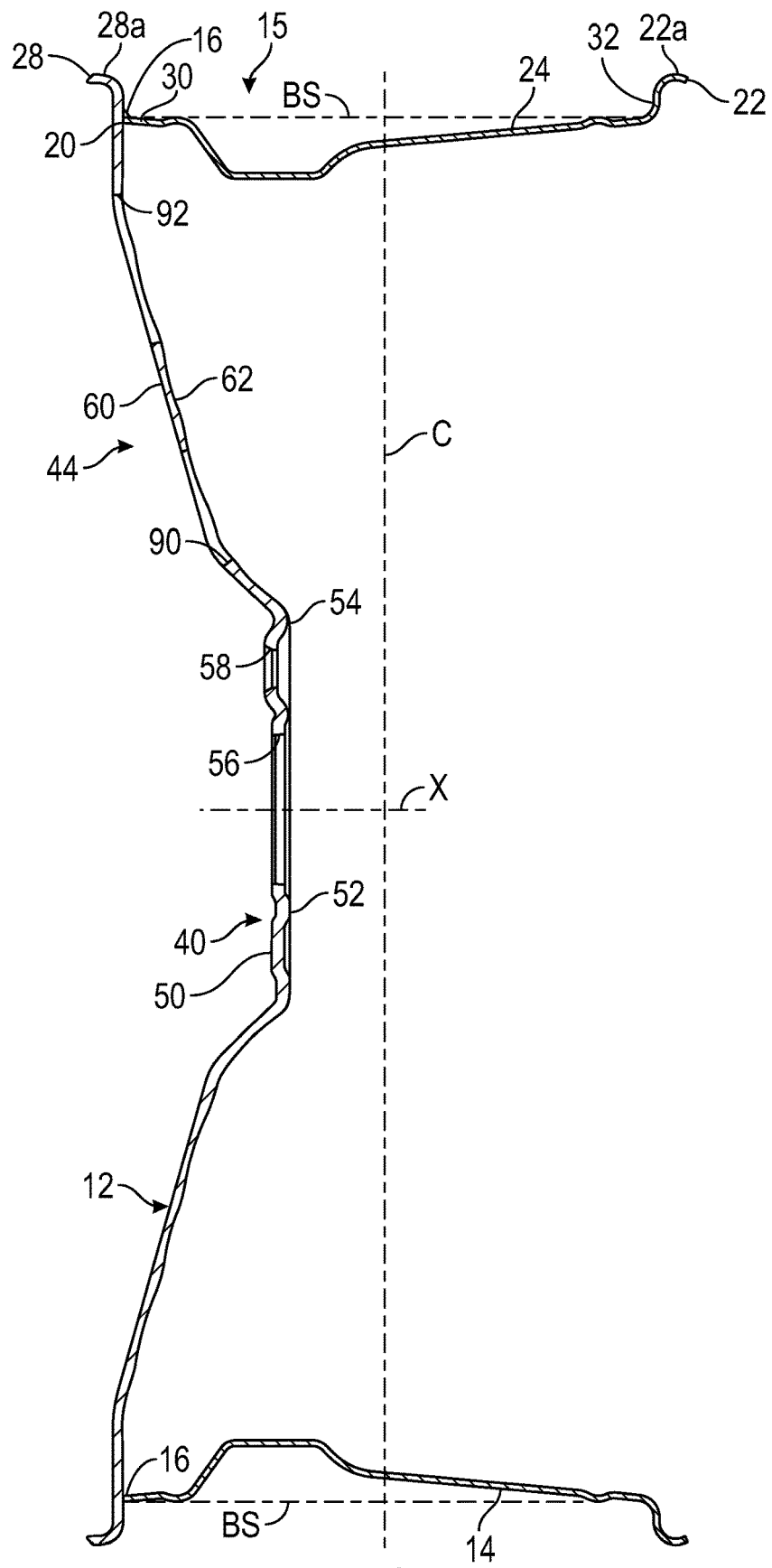
FIG. 4 is a cross-sectional view of the wheel taken along lines 4-4 in FIG. 3.

In a preferred embodiment (and as illustrated herein), the steel wheel rim 14 is formed by a rolling and forming process to obtain the desired annular shape, as shown in FIGS. 1 through 4, As shown in FIG. 4, the wheel rim 14 includes a front circumferential edge 20, and a rear facing circumferential edge 22. The rear facing circumferential edge 22 defines an inboard bead seat retaining flange 22a for contacting and sealing against a wall of the tire when mounted on the finished wheel 10, The wheel rim 14 further includes a generally tubular or cylindrical central wall 24 extending between the edges 20 and 22. The edges 20 and 22 and the central wall 24 generally define the tire well 15. The central wall 24 may have any suitable shape for receiving the tire as well as providing rigidity to the annular shaped wheel rim 14. Thus, the central wall 24 is preferably not perfectly tubular or cylindrical but includes curvatures or bends therein.

As best shown in FIG. 4, the front edge 20 of the wheel rim 14 is formed to provide a joining welding edge with the rear of the wheel disc 12. It is noted that in the illustrated embodiment as best shown in FIG. 4, an outer circumferential edge 28 of the wheel disc 12 defines an outboard bead seat retaining flange 28a for contacting and sealing against a wall of the tire when mounted on the wheel 10. Of course, the wheel disc 12 and the wheel rim 14 could be alternatively formed such that the outboard bead seat retaining flange 28a is formed on the wheel rim 14 instead. In this situation, the outer circumferential edge of the wheel disc would have a smaller diameter and would be welded to an interior wall of the central wall 24.

When the wheel 10 is formed by joining the wheel disc 12 to the wheel rim 14, the wheel 10 defines a centerline C or center-plane that is approximately located equally spaced axially from the inboard and outboard seat retaining flanges 22a and 28a of the wheel 10, as shown in FIG. 4. The wheel 10 includes outboard and inboard bead seats 30 and 32 where the tire contacts and seals against the wheel 10. The bead seats 30 and 32 may be located generally adjacent to the inboard and outboard seat retaining flanges 22a and 28a, respectfully. Broken lines, indicated generally by BS, schematically represent the bead seat or inner diameter portion of a tire that is mounted on the wheel 10. The conventionally known "rim width" may be determined as the axial distance between the bead seats 30 and 32. The wheel diameter is generally the radial diameter of the bead seats 30 and 32.

Referring to FIGS. 1 through 4, the wheel disc 12 is generally comprised of or defined by three portions: a central hub, indicated generally at 40, the outer circumferential edge 28, and an annular transition portion, indicated generally at 44. The hub 40 is preferably circular and is generally defined as the central portion of the wheel disc 12 and functions as a wheel mounting portion or center mounting portion of the wheel 10. The transition portion 44 is generally annulus or ring-shaped and radially extends between the hub 40 and the outer circumferential edge 28. The transition portion 44 generally encircles the hub 40. As will be described in detail below, the transition portion 44 is preferably subdivided into a plurality of segments passing into or adjacent one another or into the hub 40 and the circumferential edge 28. As will also be explained in detail below, the transition portion 44 has a plurality of ventilation holes formed therein.

Figure 7:
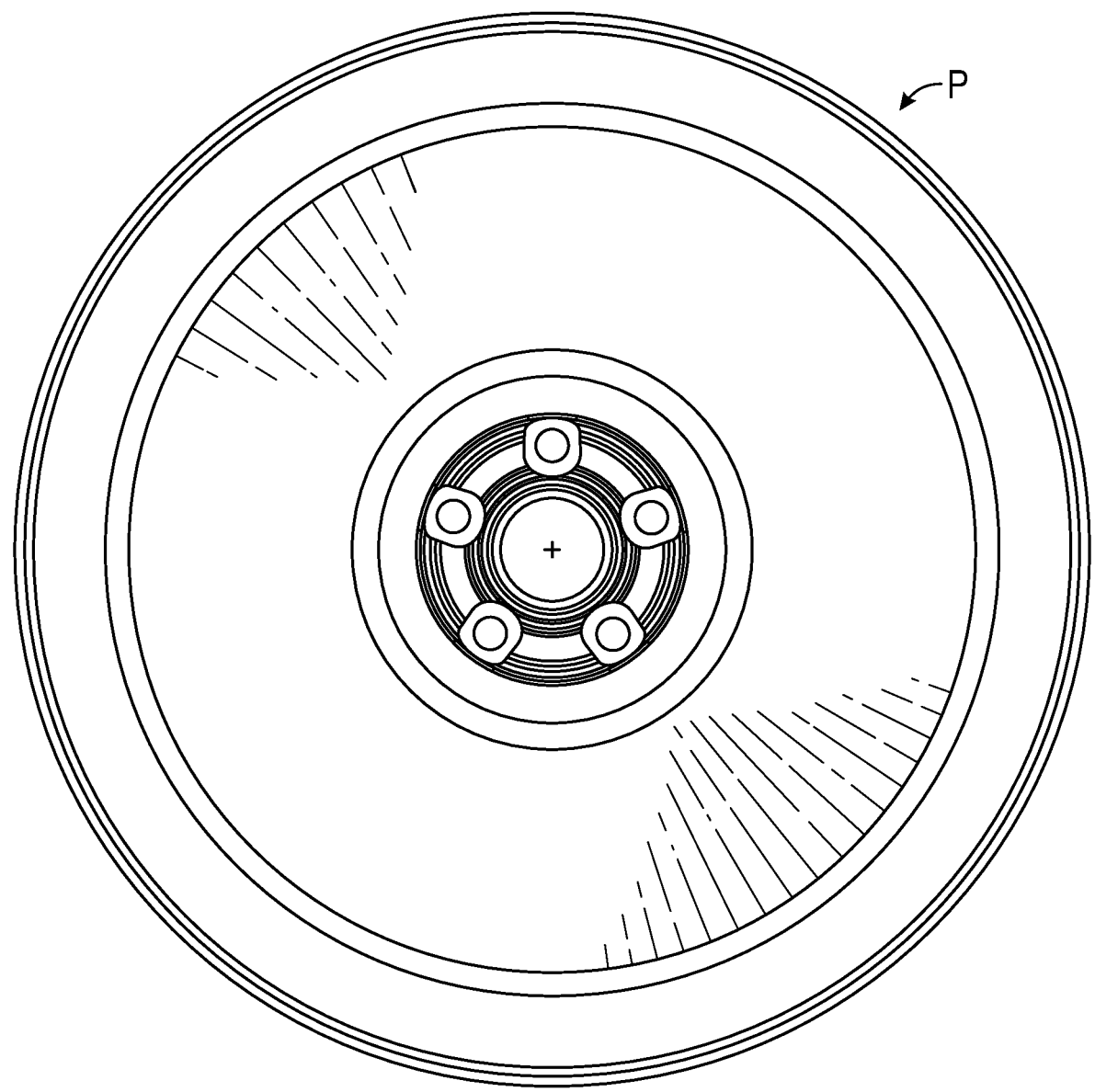
FIG. 7 is a front elevational view of a preform for use in forming the wheel disc of FIG. 1.

In a preferred embodiment, the wheel disc 12 is preferably produced from a single annular or ring-shaped blank, which is then formed by suitable means to form the wheel disc 12. The blank may be first provided as a smooth flat planar steel disc and then shaped into a partially formed wheel disc or wheel disc preforms by any suitable means, such as for example stamping or flow forming. FIG. 7 represents a preform, indicated generally at P, for use in forming the wheel disc 12. The preform P may be formed with the profile shape of the transition portion 44 illustrated in FIG. 5, for example. Preferably, the final shape or contour of the wheel disc 12 is formed by a flow forming process.

It is known to produce wheel discs by a flow forming or flow turning process. However, as will be explained in detail below, the present invention relates to the manufacture of a wheel disc 12 by a flow forming process that preferably provides for varying thicknesses in the transition portion 44. Preferably, in the flow forming process, a flow forming machine is used to form the wheel disc preform into the desired shape of the wheel disc 12. For example, there is schematically illustrated in FIG. 24 a flow forming machine, indicated generally at 46, having a mandrel 47 which receives a wheel disc preform 48. The mandrel 47 may have a profiled surface 47a corresponding to the desired profile shape of the final formed wheel disc. The wheel disc preform P may be clamped at a central region such as the hub 40. The material of the wheel disc preform extending radially outwardly from the hub 40 is pressed and elongated by means of flow forming under rotation of a roller 49 (or other tools) against wheel disc preform mounted on the mandrel 47 (or other tools) in order to obtain the desired contour. Note that the mandrel 47 and the rollers 49 are drawn very schematically and generic. Thus, the cross-sectional profile of the transition portion 44 can be produced to provide for a desired varying thickness of the transition portion 44. This is unlike conventional Wheel discs which are made by flow forming or flow turning having generally uniform surfaces on their inner and outer sides of the wheel disc.

Figure 1:
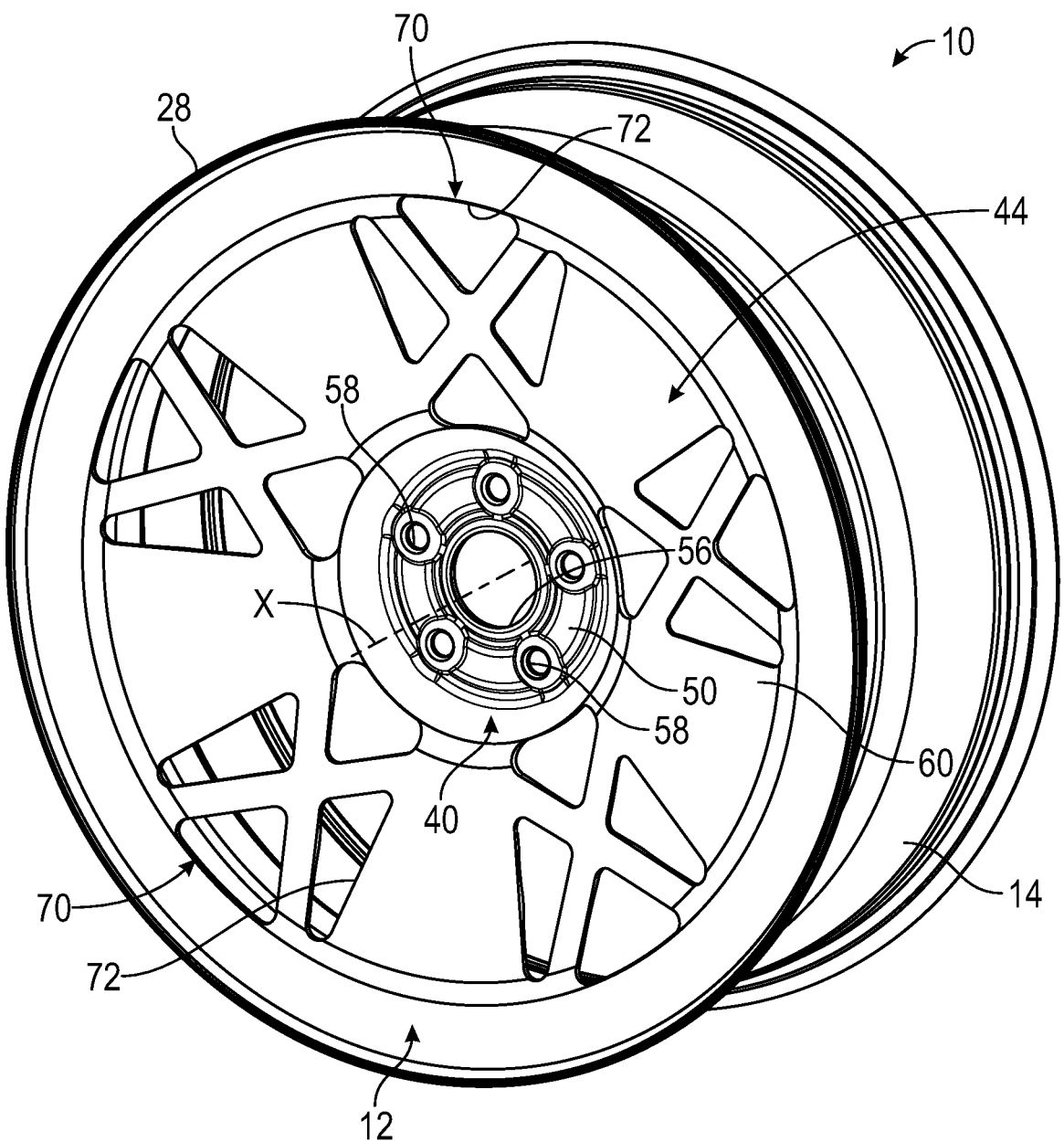
FIG. 1 is a front perspective view of an embodiment of a vehicle wheel in accordance with the present invention.
Figure 2:
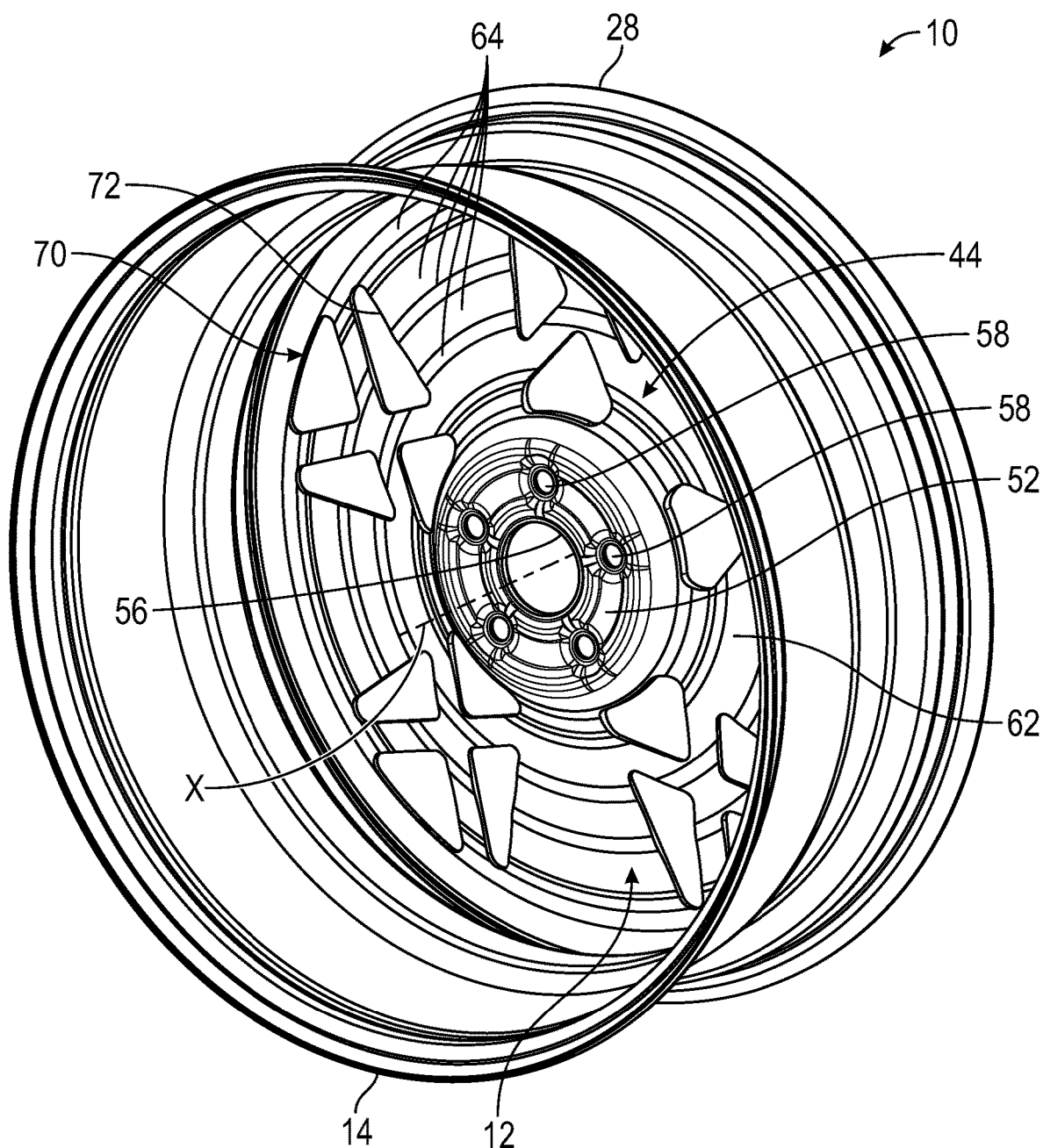
FIG. 2 is a rear perspective view of the wheel of FIG. 1.
Figure 3:
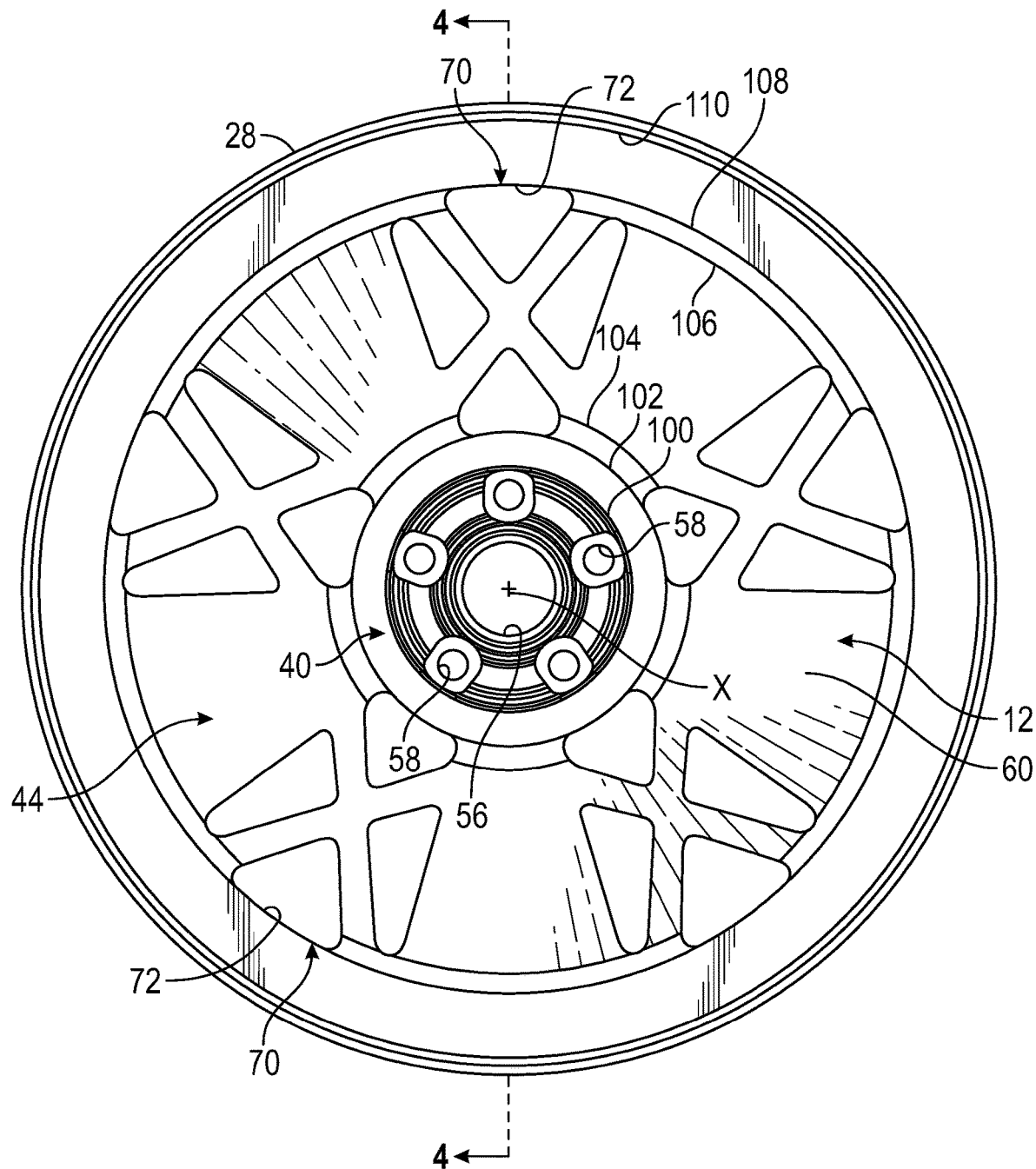
FIG. 3 is a front elevational view of the wheel of FIG. 1.
Figure 5:
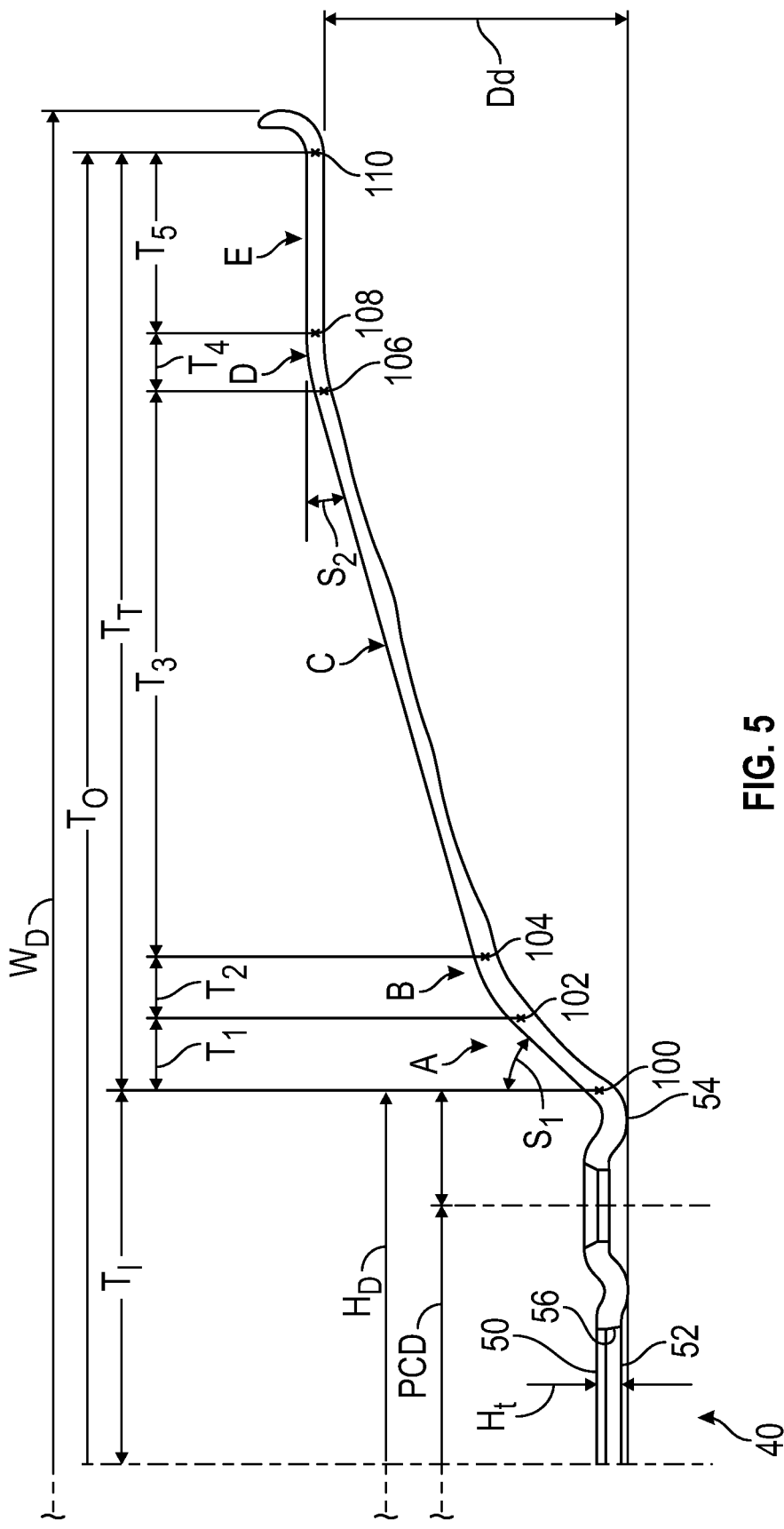
FIG. 5 is an enlarged sectional view of a portion of the wheel disc of the wheel of FIG. 1 illustrating the profile details of the rear surface of the wheel disc.

In the illustrated embodiment, the hub 40 has a front face or front surface 50, as seen in FIGS. 1, 3, 4 and 5, and a rear face or rear surface 52, as seen in FIGS. 2, 4, and 5. The front surface 50 is located on the outboard side of the wheel 10 when mounted on a vehicle. The rear surface 52 faces the inboard side of the wheel 10 when mounted on a vehicle. The hub 40 functions as a wheel mounting portion or center mounting portion of the wheel 10 for connecting with an axle (not shown) via a plurality of lug bolts (not shown) and lug nuts (not shown).

The hub 40 includes a circular outer edge portion, indicated generally at 54, which generally defines the edge of the hub 40 which joins or connects with the transition portion 44 of the wheel disc. The hub 40 has a diameter $H_D$ (see FIG. 5). Although the hub 40 includes a plurality of apertures formed therein, as will be discussed in detail below, the hub 40 may be formed with a relatively constant thickness $H_t$ (see FIG. 5) between the front and rear surfaces 50 and 52. In fact, the thickness $H_t$ of the hub 40 may coincide with the thickness of the initial blank and/or preform(s) from which the wheel disc 12 is formed. Of course, the hub 40 may be formed with a varying thickness if so desired. In a preferred embodiment, the thickness $H_t$ is within a range of about 3 millimeters to about 7.5 In a more preferred embodiment, the thickness IL is within a range of about 3.5 millimeters to about 6.8 millimeters.

The hub 40 includes a centrally located pilot aperture or hub hole 56. The hub hole 56 extends along the wheel axis X. The hub hole 56 may accommodate a portion of the axle and/or receive a protective/decorative cap (not shown). The hub hole 56 may have any suitable diameter. The hub hole 56 may be formed by a stamping process performed on the blank and/or preform(s).

A plurality of lug bolt receiving holes 58 are formed in the hub 40 and are spaced circumferentially around the hub hole 56 and the wheel axis X. The lug bolt receiving holes 58 are preferably spaced circumferentially about the hub hole equidistant from one another. The lug bolt receiving holes 58 may be spaced relative the wheel axis X at a diameter commonly referred to as the pitch circle diameter or PCD, as shown in FIG. 5. In the illustrated embodiment, the hub 40 includes five lug bolt receiving holes 58. Alternatively, the number and/or location of the lug bolt receiving holes 58 may be other than illustrated if so desired. The lug bolt receiving holes 58 receive the lug bolts (not shown) for securing the vehicle wheel 10 with lug nuts (not shown) on the axle of an associated vehicle. The lug bolt receiving holes 58 may also be used to secure the blank for the flow forming machine during production of the wheel disc 12.

The details of the transition portion 44 will now be discussed. The transition portion 44 defines a front face or surface 60, as seen in FIGS. 1, 3, 4 and 5, and a rear face or surface 62, as seen in FIGS. 2, 4, and 5. The front surface 60 is located on the outboard side of the wheel 10 when mounted on a vehicle. The rear surface 62 faces the inboard side of the wheel 10 when mounted on a vehicle. As stated above, in a preferred embodiment of the invention, it is preferred to form at least a portion of the transition portion 44 with varying thickness between the front and rear surfaces 60 and 62. This varying thickness optimizes the material usage of the wheel disc 12 which may reduce the overall mass of the wheel disc 12.

In a preferred embodiment, the varying thickness is produced by forming a plurality of circular waves or ring-shaped undulations or undulating "impressions", indicated generally at 64 (see FIG. 5). In the illustrated embodiment, the undulating impressions 64 are formed onto the rear surface 62 of the transition portion 44, as best shown in FIGS. 2, 4 and 5. These undulations 64 may be formed as alternating convex and concave ring-shaped curves concentric about the wheel axis X, as will be discussed below.

It should also be understood that the illustration of the wheel disc 12 shown in cross-section in FIG. 5 lacks cross-sectional lines to help with clarity and understanding of the drawing in FIG. 5. The detail of the drawing in FIG. 5 (as well as the other Figures) is not necessarily to scale and may have exaggerated dimensions to assist in clarity and understanding of the drawings.

It should also be understood that formations of undulations 64 formed in the rear surface 62 of the transition portion 44 is only one example of providing a varying thickness within the transition portion 44 in the radial direction. Other suitable examples of varying or not varying the thickness of the transition portion 44 may be found in the following patent documents which are all incorporated by reference herein in entirety: U.S. patent application Ser. Nos. 17/686,488, 17/686,493, 17/686,495 and 17/686,497, all filed on Mar. 4, 2022. Thus, the transition portion 44 may be formed with varying thickness by many different configurations. Alternatively, the transition portion 44 may be formed with a non-varying continuous thickness as extending radially between the hub 40 and the outer circumferential edge 28, such as shown in U.S. Pat. No. 6,785,962 to Coleman, filed on May 23, 2002 having issued on Sep. 7, 2004, the disclosure of which incorporated by reference herein in entirety.

For descriptive purposes, the transition portion 44 is subdivided into a plurality of concentric radial or annular segments. In the illustrated embodiment as best shown in FIG. 5, there are generally five segments, indicated generally at A, B, C, D and E. The segments A, B, C, D and B are separated from one another at transition points 100, 102, 104, 106, 108, and 110. The transition points 100, 102, 104, 106, and 108 are radially spaced from one another and refer to a radial dimension or distance relative to the wheel axis X. For descriptive and clarity purposes, the transition points 100, 102, 104, 106, 108, and 110 are schematically represented as circular solid lines in FIGS. 3 and 6. The segments A, B, C, D and E generally pass into each other or into the hub 40 or the outer circumferential edge 28 of the wheel disc 12. Each of the segments A, B, C, D and E generally includes an inner end situated closer to the wheel axis X, and an outer end situated farther away from the wheel axis X.

More specifically, the segment A extends between transition points 100 and 102. The transition point 100 generally corresponds to the outer edge of the circular outer edge portion 54 of the hub 40. The curved segment B extends between the transition points 102 and 104. The segment C extends between the transition points 104 and 106. The curved segment D extends between the transition points 106 and 108. The segment E extends between the transition points 108 and 110. The transition point 110 is generally positioned adjacent the outer circumferential edge 28 of the wheel disc 12.

As can be seen in FIG. 5, the transition points 100, 102, 104, 106, 108, and 110 generally correspond to curvature changes on the front surface 60 of the transition portion 44. In a preferred embodiment of the wheel disc 12, the front surface 60 of the transition portion 44 can generally be described as being "smooth" (without undulations) such that changes in the profile of the front surface 60 are either straight without curvature to form a straight frustoconical shape, or include a single smooth curvature between two segments having frustoconical shapes with differing slopes (angles) relative to the wheel axis X, thereby connecting the two frustoconical slopes. The term smooth as used herein may refer to a surface that is generally an even and regular surface generally free from perceptible projections, lumps, or indentations. Of course, a smooth surface may be curved such as the front surfaces 60 of the ring-shaped curved segments B and D. Contrary, the rear surface 62 of the transition portion 44 preferably includes undulating curves of concentric rings formed therein, as will be discussed below.

The front surface 60 between the transition points 100 and 102 is relatively straight (shown in cross-section) or without curvature forming a generally straight frustoconical shape about the wheel axis X. The inner end of the segment A connects with the circular outer edge portion 54 of the hub 40. The outer end of the segment A connects with the inner end of the segment B. Similar to the segment A, the front surface 60 at the segment C, between the transition points 104 and 106, is relatively straight without curvature forming a generally straight frustoconical shape about the wheel axis X. However, the slope at segment C is preferably different from the slope at segment A relative to the wheel axis X. Segment B (between transition points 102 and 104) joins the segments A and C together with a curvature that smoothly blends in with both of the segments A and C. In a similar manner, the curved segment D (between the transition points 106 and 108) blends the sloped frustoconical front surface 60 of the segments C and E (between the transition points 108 and 110) together smoothly. It is noted that the front surface 60 at the segment E may be perpendicular to the wheel axis X.

Figure 6:
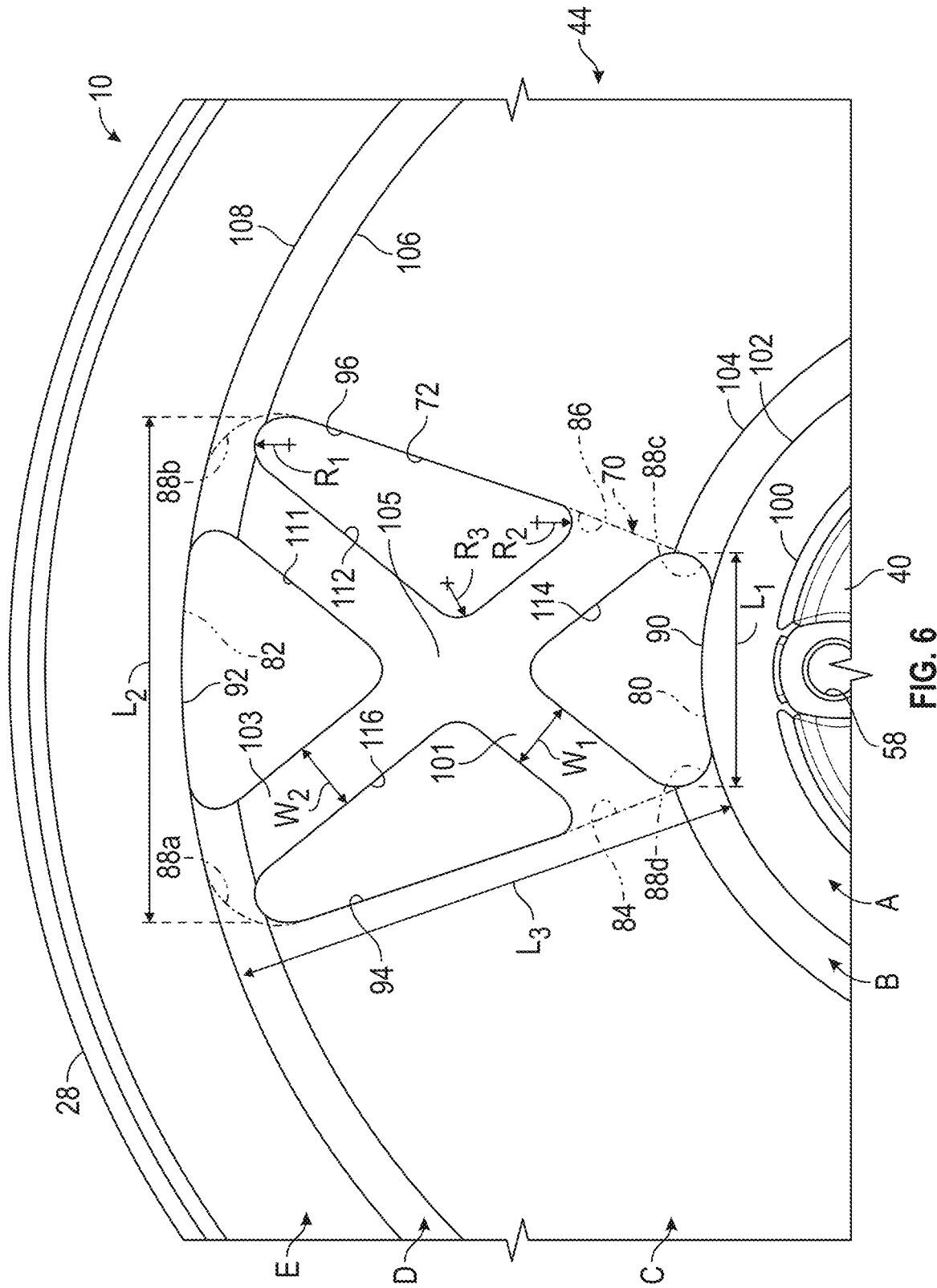
FIG. 6 is an enlarged schematic front elevational view of a portion of the wheel of FIG. 1 illustrating the features of a vent hole region and the corresponding vent hole.

A shown in FIG. 6, the conical front surface 60 at the segment A is sloped at an angle $S_1$ relative to the wheel axis X. In the illustrative embodiment, the angle $S_1$ is about 43 degrees relative to the wheel axis X. In a preferred embodiment, the angle $S_1$ may range from about 15 degrees to about 60 degrees In a more preferred embodiment, the angle $S_1$ may range from about 20 degrees to about 45 degrees.

The conical front surface 60 at the segment C is sloped at an angle $S_2$ relative to 90 degrees from the wheel axis, as indicated in FIG. 6. In the illustrative embodiment, the angle $S_2$, is about 16 degrees. Thus, the angle $S_2$, is about 74 degrees (90-16) relative to the wheel axis X. In a preferred embodiment, the angle $S_2$ may range from about 45 degrees to about 85 degrees. In a more preferred embodiment, the angle $S_2$ may range from about 50 degrees to about 70 degrees.

The wheel 10 can be manufactured to any size suitable size for mounting a tire thereon. Tire sizes for conventional vehicles are generally within the range of about 16 inches (406 mm) to about 22 inches (560 mm), for example. With respect to FIG. 5 and for descriptive purposes, the illustrated embodiment of the wheel disc 12 relates to a wheel 10 having a 22 inch or about 560 mm "wheel diameter" as conventionally understood as the diameter of the bead seats 30 and 32. Note that the outermost diameter $W_D$ for the illustrated embodiment is about 600 mm. The rear surface 62 of the segment E is spaced by a depth $D_d$ taken in an axial direction generally from the rear surface 52 of the hub 40.

In the illustrative embodiment, the depth $D_d$ is about 89 mm. In a preferred embodiment, the depth $D_d$ may range from about 25 millimeters to about 120 millimeters. In a more preferred embodiment, the depth $D_d$ may range from about 30 millimeters to about 110 millimeters. In general, the dimensions of the depth $D_d$, the slopes $S_1$ and $S_2$, and the dimensions of the segments A, B, C, D, and E will be generally determined by the requirements for accommodating a brake caliper (not shown) adjacent thereto when the wheel 10 is mounted on the vehicle.

A stated above, the transition portion 44 may be formed to any suitable size and shape. Referring to the illustrated embodiment of FIG. 5, the transition. portion 44 is dimensionally defined by an outer radius $T_O$ and an inner radius $T_I$ from the wheel axis X. The radial length or distance of the transition portion 44 is defined by the radial length $T_T$ ($T_O$ minus $T_I$). In a preferred embodiment, the radial length $T_T$ may range from about 110 millimeters to about 220 millimeters. In a more preferred embodiment, the radial length $T_T$ may range from about 120 millimeters to about 220 millimeters.

As shown in FIG. 5, the segment A has a radial length $T_1$. The segment B has a radial length $T_2$. The segment C has a radial length $T_3$. The segment D has a radial length $T_4$. The segment E has a radial length $T_5$. In the illustrated embodiment, the radial length $T_1$ is about 8% of the radial length $T_T$. The radial length $T_2$ is about 6% of the radial length. $T_T$. The radial length $T_3$ is about 61% of the radial length Tr. The radial length $T_4$ is about 6% of the radial length $T_T$. The radial length $T_5$ is about 19% of the radial length $T_T$. In a preferred embodiment, the radial length $T_1$ may range from about 5% to about 30% of the radial length $T_T$. The radial length $T_2$ may range from about 5% to about 30% of the radial length $T_T$. The radial length $T_3$ may range from about 60% to about 80% of the radial length $T_T$. The radial length $T_4$ may range from about 5% to about 15% of the radial length $T_T$. The radial length $T_5$ may range from about 10% to about 30% of the radial length $T_T$.

As stated previously, the rear surface 62 of the transition portion 44 preferably includes a plurality of undulating impressions 64 of concentric rings formed therein. As shown in FIG. 5, the rear surface 62 of the transition portion 44 has a plurality of alternating concave and convex undulations 64 defined by curves formed by various radii. Note that the radii may have differing lengths relative to one another. The term concave as used herein refers to a curvature formed into the rear surface 62 towards the front surface 60, thereby thinning the thickness of the transition portion 44 at that region. A convex curvature relates to a curvature formed into the rear surface 62 but in a direction away from the front surface 60, thereby expanding the thickness of the transition portion 44 at that region.

In the illustrated embodiment, the segment E does not include curvatures formed in the rear surface 62 therein and is preferably planar such that the rear surface 62 at segment E is perpendicular to the wheel axis X. Of course, the segment E may be formed with a single curvature or multiple curvatures if so desired.

As can be appreciated, depending upon the particular size of the vehicle wheel (which can typically range from 16 inch to 22 inch), the segments A-E may have any combination of the following number of ring-shaped curvatures in accordance with the present invention. The segment A may include anywhere from zero to three ring-shaped curvatures. The segment B may include anywhere from zero to two ring-shaped curvatures. The segment C may include anywhere from one to twenty ring-shaped curvatures. The segment D may include anywhere from zero to two ring-shaped curvature. The segment E may include anywhere from zero to three ring-shaped curvatures.

The blank or wheel disc preform, such as the preform P illustrated in FIG. 7, which is used to form the wheel disc 12 may be initially formed with a constant thickness that corresponds to the thickness $H_t$ of the hub 40. During formation of the undulating impressions 64 formed in the rear surface 62 of the transition portion 44, the thickness at the segments A, B, C, D, and E may be reduced. In a preferred embodiment, the segment A has a maximum thinning of 40% of the thickness $H_t$ of the hub 40. In a preferred embodiment, the segment B has a maximum thinning of 40% of the thickness $H_t$ of the hub 40. In a preferred embodiment, the segment C has a maximum thinning of 60% of the thickness $H_t$ of the hub 40. In a preferred embodiment, the segment D has a maximum thinning of 40% of the thickness $H_t$ of the hub 40. In a preferred embodiment, the segment E has a maximum thinning of 60% the thickness $H_t$ of the hub 40.

The transition portion 44 preferably provides for ventilation for wheel brakes (not shown) mounted adjacent to the wheel disc 12. In a preferred embodiment, the wheel disc 12 is designed such that multiple vent hole regions, indicated generally at 70, are circumferentially spaced around the transition portion 44 about the wheel axis X. As will be discussed in detail below, each of the vent hole regions 70 preferably includes at least one vent hole, indicated generally at 72, within the vent hole region 70. More preferably, the vent hole 72 also includes features which subdivides the vent hole 72 into smaller holes, as will be discussed in detail below. The term "vent hole region" as used herein generally describes at least one area located on the transition portion 44 which receives a through opening within the area. The through opening is generally defined as the vent hole 72 which, as stated above, may be separated into multiple smaller openings or holes. The ventilation holes may be formed by any suitable method, such as with a piercing, punching or cutting operation.

The formation of the vent holes 72 removes a relatively substantial portion of the material from the transition portion 44. It is preferred that the design of the wheel disc 12, and in particular the transition portion 44, be designed such that the presence of the vent holes 72 are considered when designing the undulations 64 on the rear surface 62 of the transition portion 44 (or any other thickness variation features of the transition portion 44). Thus, the lack of material being removed from the areas at the vent holes 72 determines the design aspects and geometry of the varying thickness of the transition portion 44. Of course, other factors should be considered such as the weight target of the wheel 10, the design intent of the wheel 10, and the performance intent of the wheel 10.

Stress levels at critical points within the wheel disc 12 should be discovered and considered in determining the shape of the rear surface 62 of the transition portion 44. Thus, the shape of the vent holes 72 can affect the optimization results in order to achieve the performance requirements. The design implications for the desired thickness differences in the undulations 64 formed in the rear surface 62 of the transition portion 44 will generally correlate to the location and the lack of material from the vent holes 72. In general, designing a vent hole region 70 with one large opening about its entire perimeter would typically remove too much material. This lack of material within the vent hole region 70 could lessen the rigidity of the wheel disc 12 or would require too much material thickness of the transition portion 44 to compensate. Thus, one aspect of the invention is to design the wheel disc 12 such that the varying thickness of the transition portion 44 in conjunction with the design of the shape and size of the vent holes 72 cooperate to provide a sufficiently rigid wheel disc 12 having a relatively low overall mass.

In the illustrated embodiment of the wheel disc 12, the wheel disc includes five vent hole regions 70 circumferentially spaced around the transition. portion 44 about the wheel axis X. In a preferred embodiment, the five vent hole regions 70 are circumferentially spaced around the transition portion about the wheel axis X equidistant from one another. This arrangement can also be seen in FIG. 8, wherein the preform P references the five vent hole regions 70. The number of vent hole regions 70 may generally correspond to the five-bolt hole pattern of the lug bolt receiving holes 58 for an aesthetically pleasing appearance. Of course, the wheel disc 12 may have any suitable number of vent hole regions 70 which may be positioned within any location in the transition portion 44.

Figure 8:
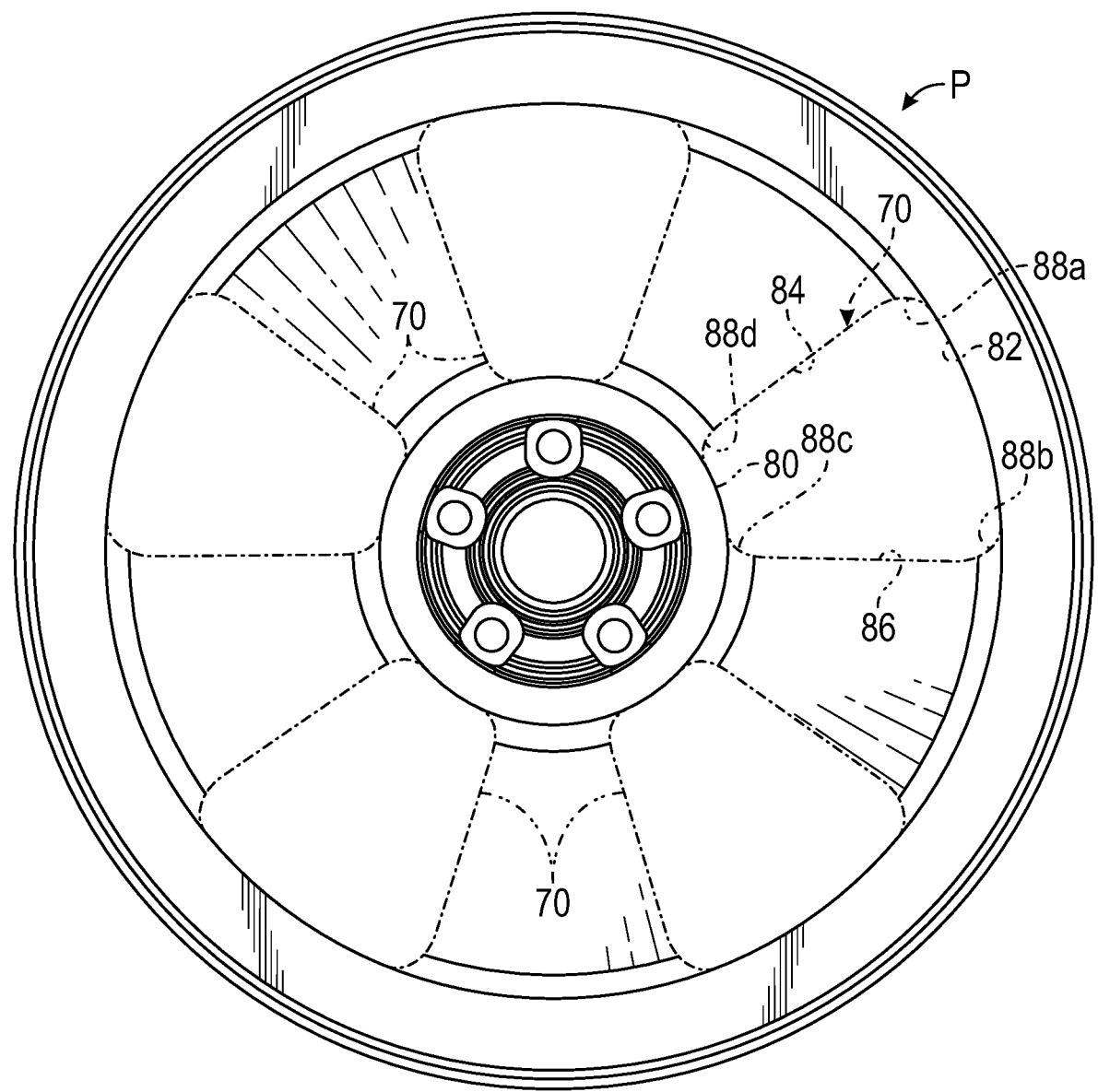
FIG. 8 is a schematic front elevational view of the preform of FIG. 7 illustrating a vent hole region arrangement for the formation of the wheel disc of FIG. 1.

It should also be understood that the vent hole regions 70 and corresponding vent holes 72 may have any suitable shape and size. In the illustrated embodiment, all five of the vent hole regions 70 and corresponding vent holes 72 are identical with one another. Thus, only one vent hole region 70 and corresponding vent hole 72 will be described in detail below. Referring now to the embodiment illustrated FIG. 6, the shape and size of the vent hole 72 generally corresponds to the same shape and size of the vent hole region 70 which have a generally radially outwardly expanding trapezoidal shape. As shown in FIGS. 6 and 8, the perimeter of the vent hole region 70 is defined by an accurate inner perimeter side 80, an arcuate outer perimeter side 82 radially spaced from the inner perimeter side 80, and a pair of radially extending sides 84 and 86. The perimeter of the vent hole region 70 may further include curved corner portions 88a, 88b, 88c, and 88d at the junctions of the sides 80, 82, 84, and 86. As discussed above, in the design of the wheel disc 12, the outer boundaries of the vent hole 72 should be contained within the perimeter of the vent hole region 70. The corresponding vent hole 72 similarly includes an arcuate inner perimeter side 90, an arcuate outer perimeter side 92 radially spaced from the inner perimeter side 90, and a pair of radially extending sides 94 and 96. If desired, the perimeter of the vent hole 72 may also include curved corner at the junctions of the sides 90, 92, 94, and 96.

It is noted that in the illustrated embodiment, the vent hole region 70 and the vent hole 72 extends through the segments B, C, and D of the transition portion 44. Additionally, the inner perimeter sides 80 and 90 are located at or about the circular transition point 102. The outer perimeter sides 82 and 92 are located at the circular transition point 108. It should be understood that this configuration is only an example of a possible vent hole region 70 and vent hole 72 size and location configuration. Vent hole regions and vent holes may be positioned anywhere within the segments A, B, C, D, and/or E. Examples of other suitable configurations will be discussed below with respect to FIGS. 9 through 22.

The inner perimeter sides 80 and 90 generally have a length $L_1$. The outer perimeter sides 82 and 92 generally have a length $L_2$. The sides 84, 86, 94, and 96 each generally have a length $L_3$. Note that in the illustrated embodiment the length L3 generally corresponds to the radial distance between the transition points 102 and 108. In a preferred embodiment, the length $L_1$ may range from about 30 millimeters to about 150 millimeters. In a more preferred embodiment, the length $L_1$ may range from about 40 millimeters to about 140 millimeters. In a preferred embodiment, the length. $L_2$ may range from about 30 millimeters to about 150 millimeters. In a more preferred embodiment, the length $L_2$ may range from about 40 millimeters to about 140 millimeters. In a preferred embodiment, the length $L_3$ may range from about 90 millimeters to about 180 millimeters. In a more preferred embodiment, the length $L_3$ may range from about 90 millimeters to about 180 millimeters. Note that the length. $L_3$ is generally directly defined relative to the wheel size.

The radii of the rounded corners 88a, 88b, 88c, and 88d may have any suitable dimension. In a preferred embodiment, the radii of the rounded corners 88a, 88b, 88c, and 88d may range from about 6 millimeters to about 30 millimeters. In a more preferred embodiment, the radii of the rounded corners 88a, 88b, 88c, and 88d may range from about 8 millimeters to about 25 millimeters.

As stated above, the vent hole 72 preferably includes features to subdivide the relatively large vent hole 72 into smaller holes formed through the transition portion 44. In the illustrated embodiment of FIG. 6, a pair of bridging portions 101 and 103 cooperate to form a cross or X-shape. The bridging portions 101 and 103 extend inwardly from the perimeter of the vent hole 72. More specifically, the bridging portion 101 extends from a radially inwardly portion of the side 94 of the vent hole 72 radially outwardly and rightward, as viewing FIG. 6, towards the rounded corner 88b. The bridging portion 103 extends from a radially inwardly portion of the side 96 of the vent hole 72 radially outwardly and leftward, as viewing FIG. 6, towards the rounded corner 88d. The bridging portions 101 and 103 cross at a common central portion 105 generally located centrally within the vent hole 72. The bridging portions 101 and 103 preferably have the same width $W_1$ and $W_2$, respectively. In a preferred embodiment, the widths $W_1$ and $W_2$ may range from about 3 millimeters to about 15 millimeters. In a more preferred embodiment, the widths $W_1$ and $W_1$ may range from about 8 millimeters to about 12 millimeters.

The extension of the bridging portions 101 and 103 from the perimeter of the vent hole 72 subdivides the vent hole 72 into four smaller holes 111, 112, 114, and 116. In the illustrated embodiment, the four smaller holes 111, 112, 114, and 116 each have a triangular shape. In a preferred embodiment, each of the corners of triangular shaped holes 111, 112, 114, and 116 are rounded which can be formed to any suitable shape or size. As an example representative of all of the holes 111, 112, 114, and 116, the hole 112 has three rounded corners having radii $R_1$, $R_2$, and $R_3$. The radii $R_1$, $R_2$, and $R_3$ may have the same dimension or they may be different. In a preferred embodiment, the radii $R_1$, $R_2$, and $R_3$ may range from about 3 millimeters to about 20 millimeters. In a more preferred embodiment, the radii $R_1$, $R_2$, and $R_3$ may range from about 6 millimeters to about 16 millimeters.

Although only two bridging portions 101 and 103 are shown, it should be understood that any number of bridging portions 101 and 103 may extend from the perimeter of the vent hole 72. In a preferred embodiment, two to four bridge portions are formed within each vent hole 72.

The vent holes 72 and corresponding holes 111, 112, 114, and 116 may be formed by any suitable manufacturing method. For example, the holes 111, 112, 114, and 116 may be formed by a stamping and/or punching process. For example, after formation of the preform illustrated in FIGS. 7 and 8 in which the desired profile of the transition portion 44 has been obtained, the holes 111, 112, 114, and 116 for all five vent holes 72 may be punched out or otherwise formed, thereby forming the final shape of the wheel disc 12. Thus, the thickness of the bridges 100 and 102 generally corresponds to the varying thickness of the transition portion 44 at the location from which they were punched out. However, the bridging portions 101 and 103 may have any suitable final thickness. For example, they may be thinned out or reshaped from an additional formation process if so desired. It should be understood that any suitable manufacturing process may be used and the formation of the holes 111, 112, 114, and 116 may be formed at any interval within the manufacturing process.

Figure 9:
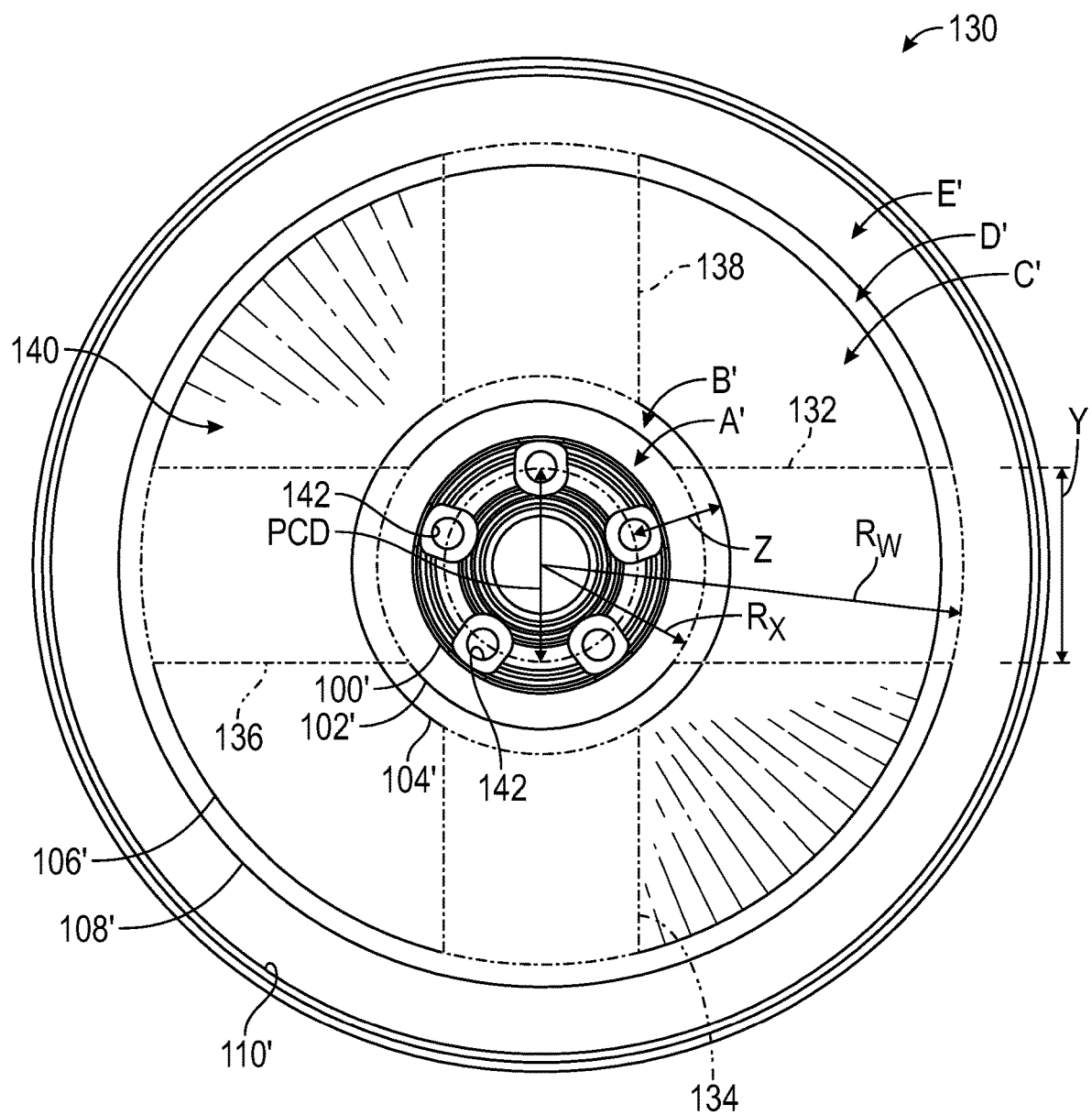
FIG. 9 is a schematic front elevational view of an alternate embodiment of a preform illustrating an alternate vent hole region arrangement.

As stated above, the vent hole regions may have any shape as determined during the design stage of the wheel disc 12. There is schematically illustrated in FIG. 9 a preform 130, having four distinct vent hole regions, indicated generally at 132, 134, 126, and 138. Note that the outer boundaries or perimeters of the four vent hole regions 132, 134, 1.36, and 138 are schematically shown by phantom or broken lines in the drawing of FIG. 9. These four vent hole regions 132, and 134, 136, and 138 are illustrated as examples of suitable vent hole region designs and should not be understood as being limiting to the present invention. The preform 130 may be similar in structure as the wheel disc 12 described above with respect to FIGS. 1 through 6. For example, the preform 130 may include a transition portion 140 similar to the transition portion 44 of the wheel disc 12 such that the transition portion 140 is defined by ring-shaped segments A', B', C'', D', and E' divided by circular transition points 100', 102', 104', 106', 108', and 110'. It is noted that the preform 130 has a five bolt hole pattern yet only four vent hole regions, thus providing an example where the number of vent hole regions need not be the same as the number of lug bolt receiving holes formed in the wheel disc.

The vent hole regions 132, 134, 136, and 138 are similar to one another in that they each have a generally rectangular shape having an inner arcuate perimeter and an outer arcuate perimeter. However, each of the schematically illustrated vent hole regions 132, 134, 1356, and 138 is illustrated extending though differing segments. The vent hole region 132 radially extends between the transition points 102' and 108', thereby extending through segments B', C', and D'. The vent hole region. 134 radially extends between the transition points 104' and 106', thereby extending through only the segment C'. 'The vent hole region 136 radially extends between the transition points 102' and 106', thereby extending through segments IT and C. The vent hole region 138 radially extends between the transition points 104' and 108', thereby extending through the segments C' and D'.

Each of the vent hole regions has a lateral width Y. In a preferred embodiment, the width. Y may range from about 30 millimeters to about 150 millimeters. In a more preferred embodiment, the lateral width. Y may range fro about 40 millimeters to about 140 millimeters.

The preform 130 also defines a radius $R_W$ which corresponds to the radius of the transition point 108'. In a preferred embodiment, the radius $R_W$ may range from about 150 millimeters to about 260 millimeters. It is noted that the preferred dimension for the radius $R_W$ generally depends upon the dimension of the wheel diameter $W_D$. For example, a preform 130 corresponding to having a wheel diameter $W_D$ of about 16 inches (406 millimeters) may have a radius $R_W$ within a preferred range of about 150 millimeters to about 180 millimeters. A preform 130 corresponding to having a wheel diameter $W_D$ of about 22 inches (559 millimeters) may have a radius $R_W$ within a preferred range of about 240 millimeters to about 260 millimeters.

The preform 130 also defines a radius $R_X$ which corresponds to the radius of the transition point 102', In a preferred embodiment, the radius $R_X$ may range from about 80 millimeters to about 110 millimeters. In a more preferred embodiment, the radius $R_X$ may range from about 80 millimeters to about 100 millimeters.

The preform 130 also defines a radial length Z which extends radially outwardly from the pitch circle diameter PCD to the transition point 104'. In a preferred embodiment, the length Z may range from about 20 millimeters to about 80 millimeters. In a more preferred embodiment, the length Z may range from about 25 millimeters to about 70 millimeters.

As stated above, the vent hole regions may have any suitable number of holes formed therein. For the vent holes regions 132, 134, 136, and 138 the preferred range is about 1 to 20 holes formed therein.

Figure 10:
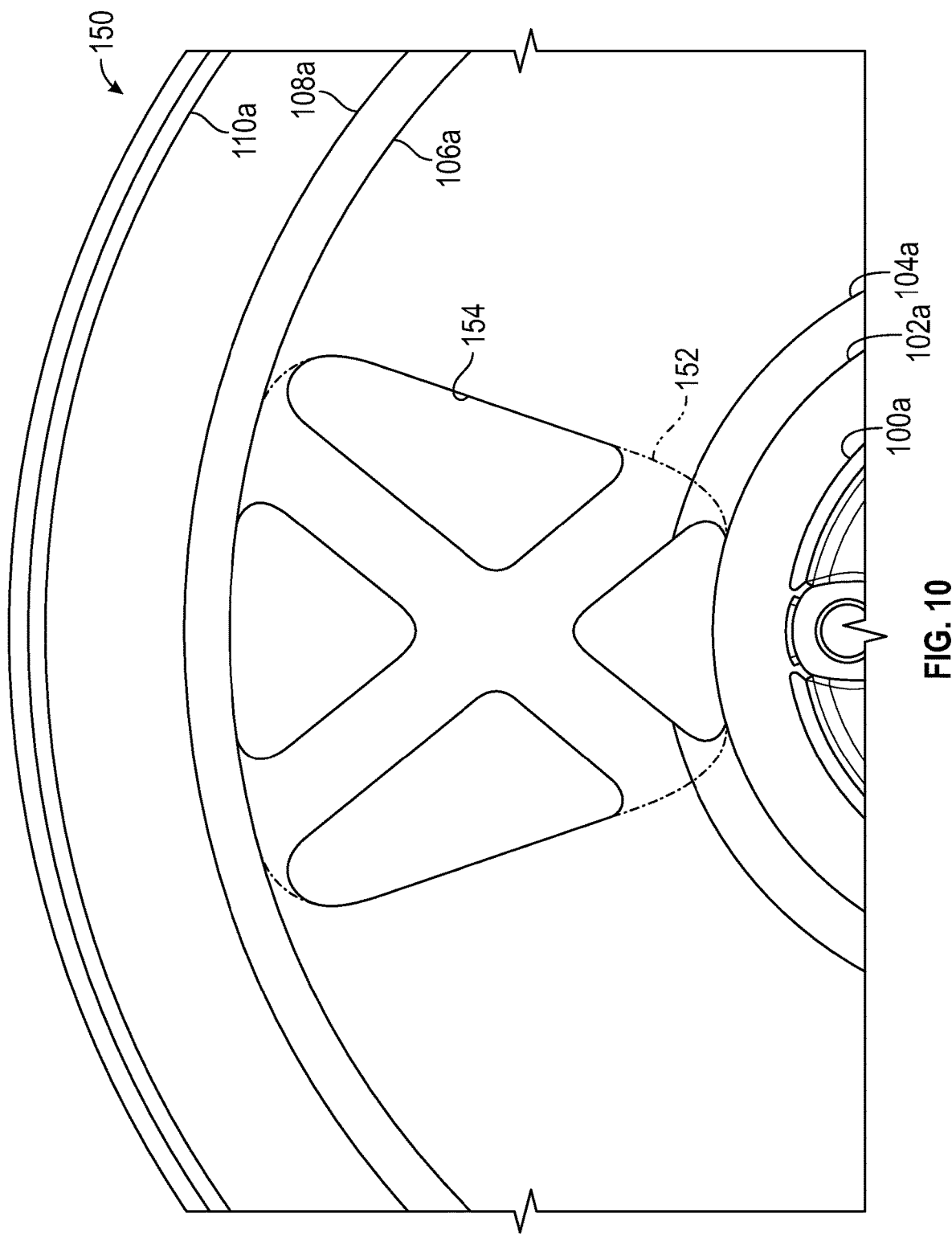
FIG. 10 is an enlarged schematic front elevational view of a portion of an alternate embodiment of a wheel disc illustrating an alternate vent hole arrangement relative to a transition portion profile.
Figure 11:
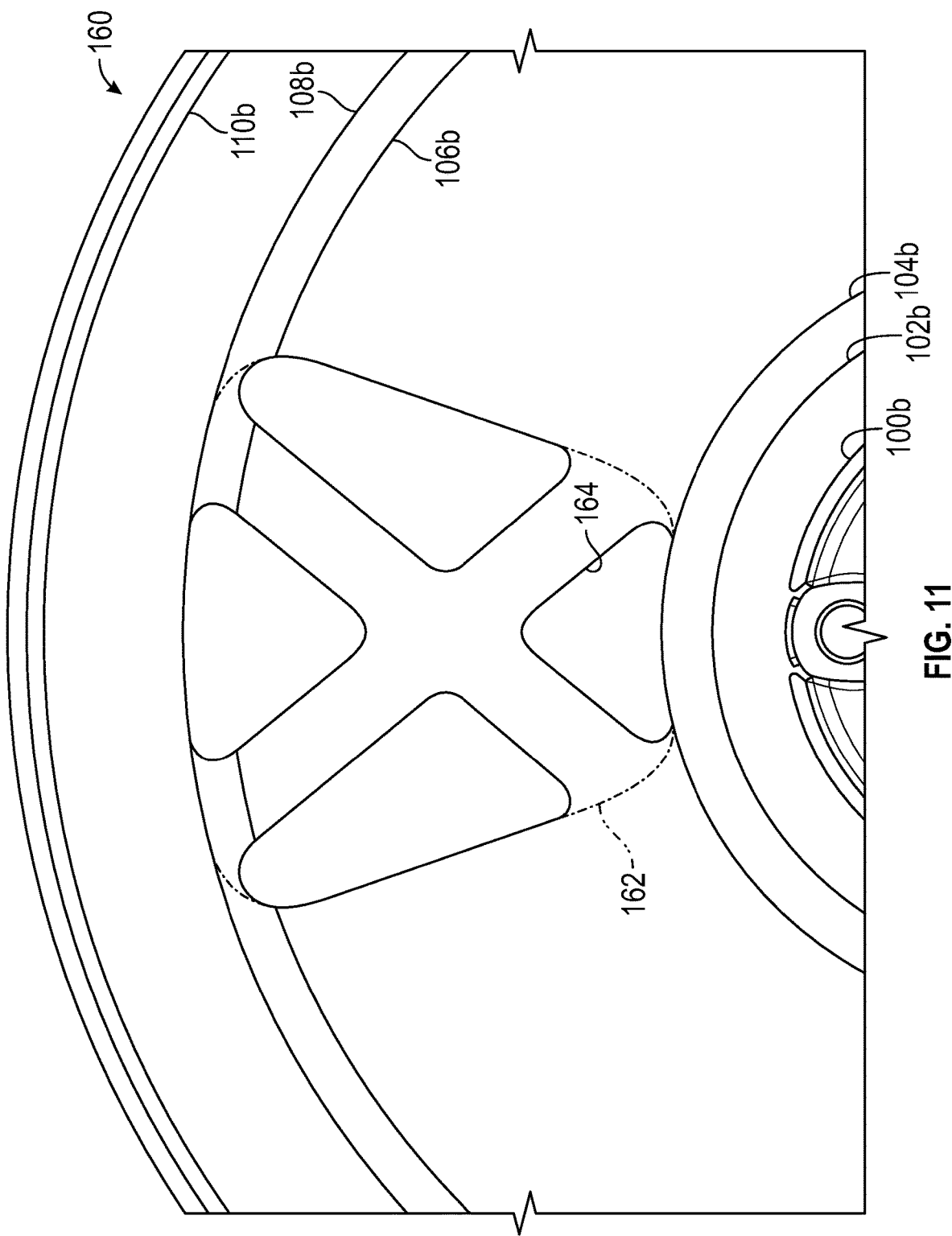
FIG. 11 is an enlarged schematic front elevational view of a portion of another alternate embodiment of a wheel disc illustrating an alternate vent hole arrangement relative to a transition portion profile.
Figure 12:
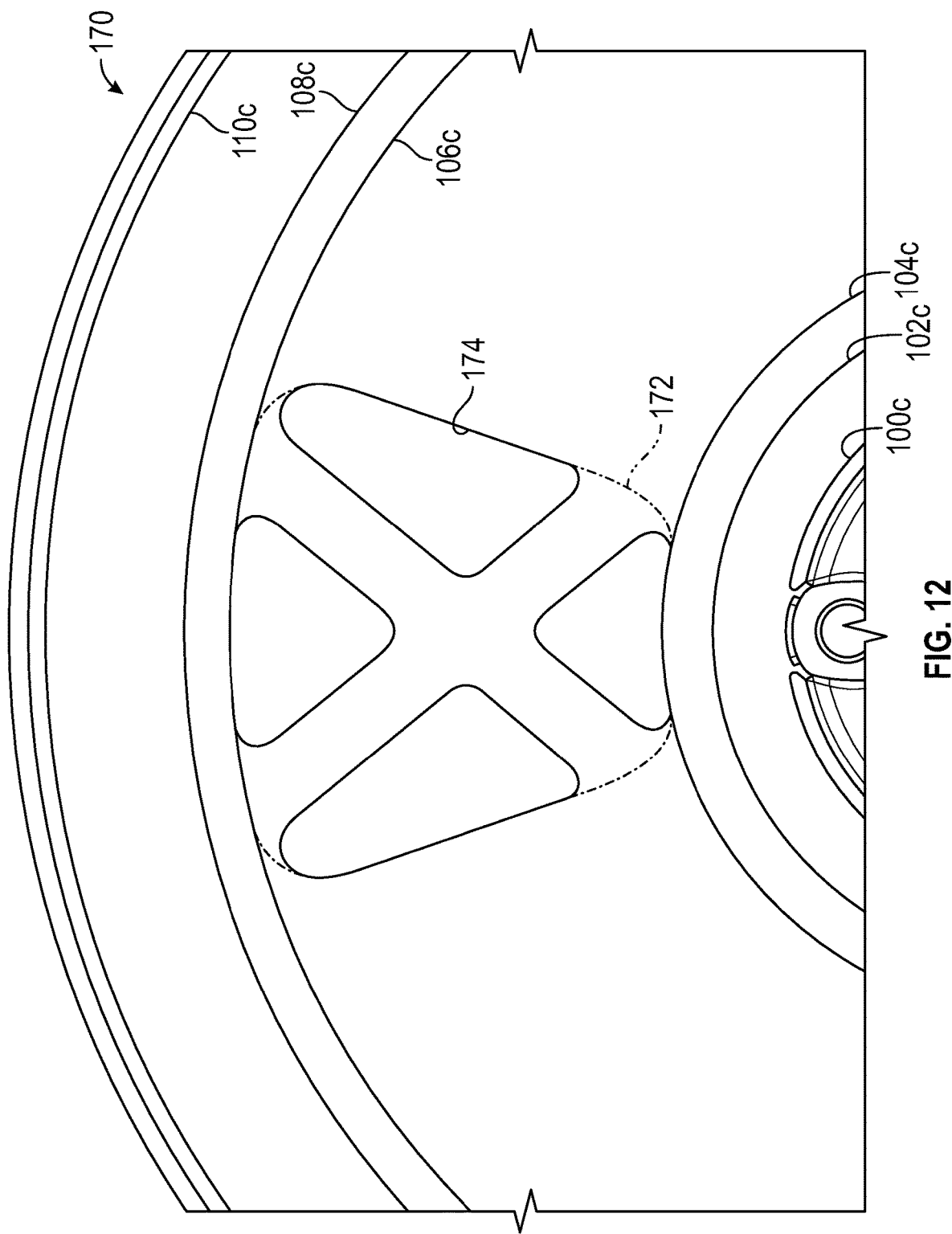
FIG. 12 is an enlarged schematic front elevational view of a portion of another alternate embodiment of a wheel disc illustrating an alternate vent hole arrangement relative to a transition portion profile.

There is illustrated in FIGS. 10 through 12 examples of alternate embodiments of wheel discs illustrating alternate vent hole arrangements relative to the profile of corresponding transition portion. It is noted that vent holes of FIGS. 10 through 12 are similar to the cross or X-shaped vent hole 72 illustrated in FIG. 6.

Referring to FIG. 10, there is illustrated a wheel disc 150 which is similar in structure as the wheel disc 12. The wheel disc 150 includes transition points 100a, 102a, 104a, 106a, 108a, and 110a which are similar to the transition points 100, 102, 104, 106, 108, and 110 of the wheel disc 12. One of the differences between the wheel discs 150 and 12 is that the wheel disc 150 includes a vent hole region 152 and a vent hole 154 which radially extend between the transition points 102a and 106a.

Referring to FIG. 11, there is illustrated a wheel disc 160 which is similar in structure as the wheel disc 12. The wheel disc 160 includes transition points 100b, 102b, 104b, 106b, 108b, and 110b which are similar to the transition points 100, 102, 104, 106, 108, and 110 of the wheel disc 12. One of the differences between the wheel discs 160 and 12 is that the wheel disc 150 includes a vent hole region 162 and a vent hole 164 which radially extend between the transition points 104b and 108b.

Referring to FIG. 10, there is illustrated a wheel disc 170 which is similar in structure as the wheel disc 12. The wheel disc 170 includes transition points 100c, 102c, 104c, 106c, 108c, and 110c which are similar to the transition points 100, 102, 104, 106, 108, and 110 of the wheel disc 12. One of the differences between the wheel discs 170 and 12 is that the wheel disc 150 includes a vent hole region 172 and a vent hole 174 which radially extend between the transition points 104c and 106c.

There is schematically illustrated in FIGS. 13 through 20 examples of alternate embodiments of vent hole regions and vent hole arrangements having differently shaped bridging portions. Note that all of the vent hole regions schematically illustrated in FIGS. 13 though 20 have a trapezoidal shape similar to the vent hole region 70 of FIGS. 1 through 6. Of course, the vent hole regions schematically illustrated in FIGS. 13 through. 20 may have any suitable shape, such as for example, rectangular such as the vent hole regions 132, 134, 136, and 138 shown in FIG. 9. It is also noted that shading lines have been added to FIGS. 13 through 20 to help indicate the bridging portions relative to through holes formed in the corresponding transition portion. The shading lines are not necessarily indicative of the shape or profile of the bridging portions. For example, the bridging portions may have frustoconical surfaces, ring-shaped undulations, or other surface profiles.

Figure 13:
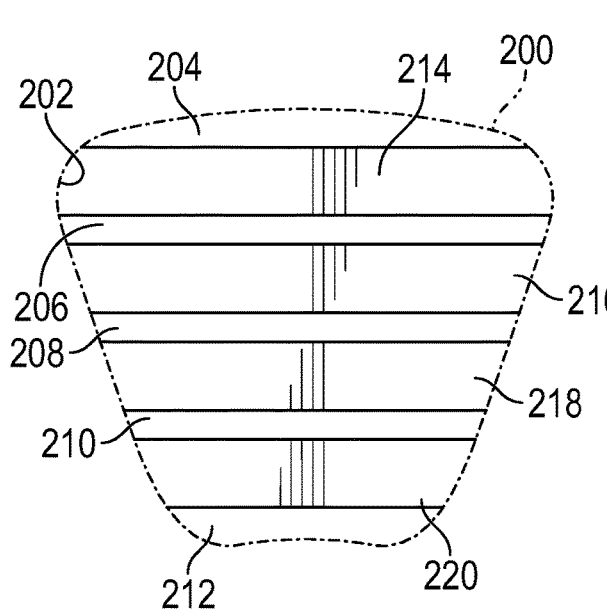
FIGS. 13 through 20 are schematic representations of alternate vent hole arrangements.

There is schematically illustrated in FIG. 13 a vent hole region 200 having a vent hole, indicated generally at 202, which is subdivided into smaller holes 204, 206, 208, 210, and 212 by bridging portions 214, 216, 218, and 220. The bridging portions 214, 21.6, 218, and 220 are generally in the form of straight parallel bands formed in the lateral direction at a normal angle relative to a radial line stemming from the wheel axis. The smaller holes 204, 206, 208, 210 and 212 are generally formed as elongated slots.

Figure 14:
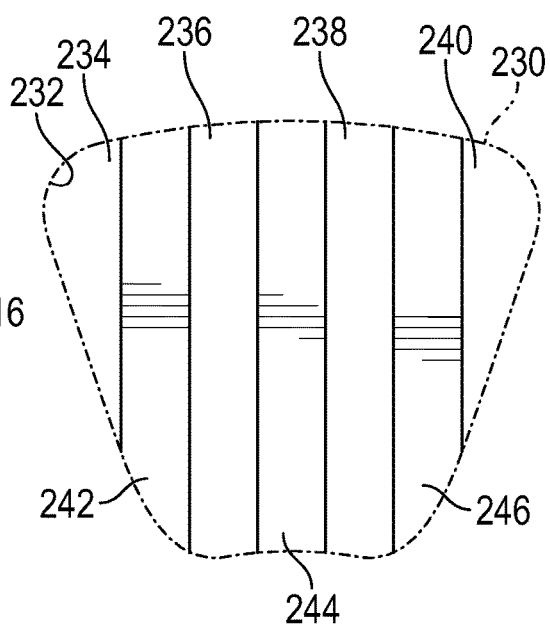

There is schematically illustrated in FIG. 14 a vent hole region 230 having a vent hole, indicated generally at 232, which is subdivided into smaller holes 234, 236, 238, and 240 by bridging portions 242, 244, and 246. The bridging portions 242, 244, and 246 are generally in the form of straight parallel bands formed parallel to a radial line stemming from the wheel axis. The smaller holes 234, 236, 238, and 240 are generally formed as elongated slots. The vent hole 232 is similar to the vent hole 202 with the exception that the bridging portions 242, 244, and 246 being formed in a perpendicular fashion.

Figure 15:
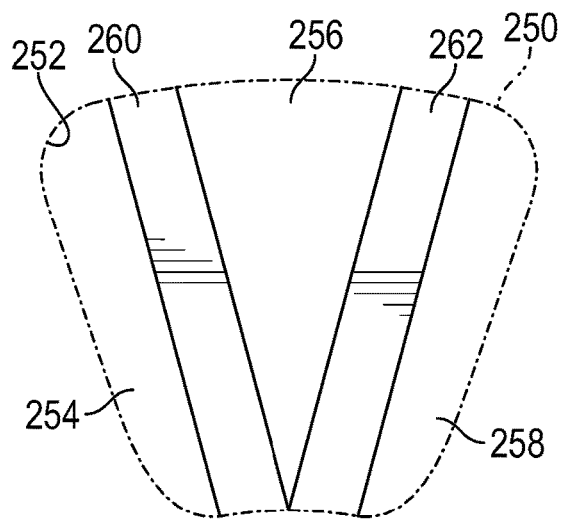

There is schematically illustrated in FIG. 15 a vent hole region 250 having a vent hole, indicated generally at 252, which is subdivided into smaller holes 254, 256, and 258 by bridging portions 260 and 262. The bridging portions 260 and 262 are generally in the form of straight bands arranged in a V-shaped pattern generally expanding radially outwardly.

Figure 16:
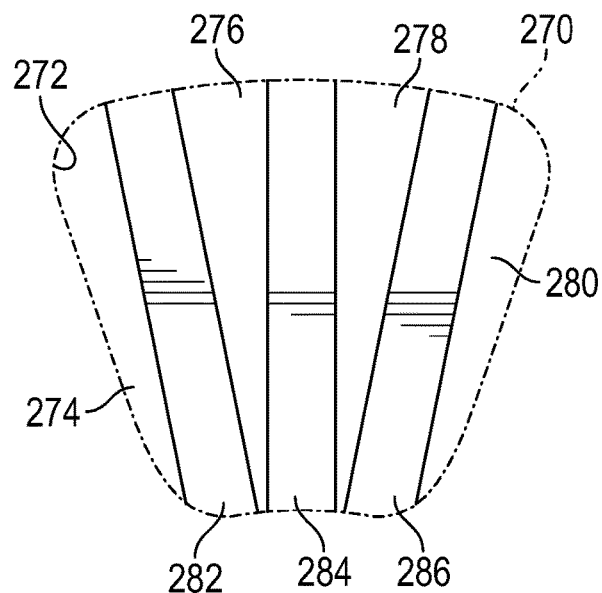

There is schematically illustrated in FIG. 16 a vent hole region 270 having a vent hole, indicated generally at 272, which is subdivided into smaller holes 274, 276, 278, and 280 by bridging portions 282, 284, and 286. The bridging portions 282, 284, and 286 are generally in the form of straight bands generally extending radially outwardly. The vent hole 272 is similar to the vent hole 252 with the exception of a center bridging portion 284 located between a generally V-shaped arrangement of the bridging portions 282 and 286.

Figure 17:
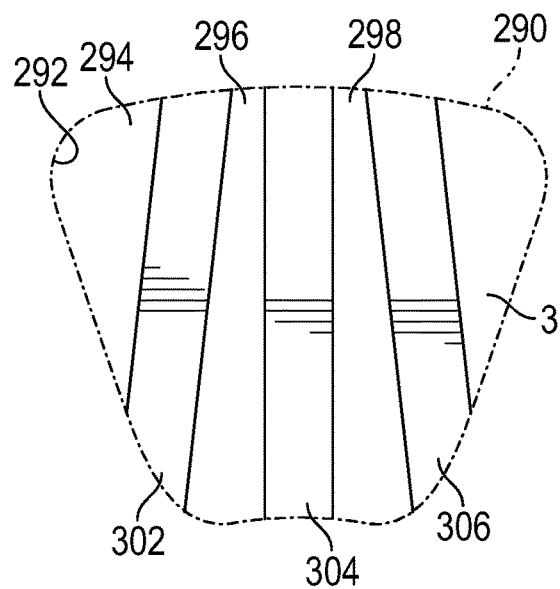

There is schematically illustrated in FIG. 17 a vent hole region 290 having a vent hole, indicated generally at 292, which is subdivided into smaller holes 294, 296, 298, and 300 by bridging portions 302, 304, and 306. The bridging portions 302, 304, and 306 are generally in the form of straight bands generally extending radially inwardly.

Figure 18:
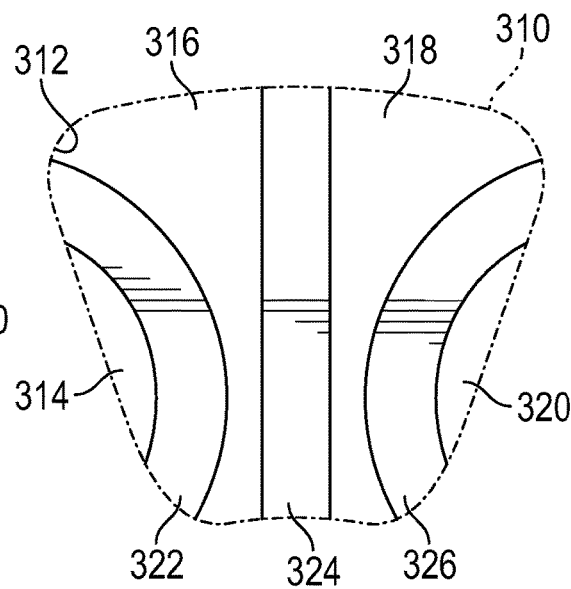

There is schematically illustrated in FIG. 18 a vent hole region 310 having a vent hole, indicated generally at 312, which is subdivided into smaller holes 314, 316, 318, and 320 by bridging portions 322, 324, and 326. The inner bridging portion 324 is generally in the form of a straight band extending radially outwardly. The two outer bridging portions 322 and 326 are formed as circular or curved bands having a mirror image shape from one another. This embodiment illustrates that bridging portions need not be straight extending from one end of the perimeter towards another end of the perimeter of the vent hole but can have other non-linear shapes. This embodiment also illustrates that the bridging portions need not be of the same design (straight or curved) and that the vent hole can have a "hybrid." type of design having differently shaped bridging portions.

Figure 19:
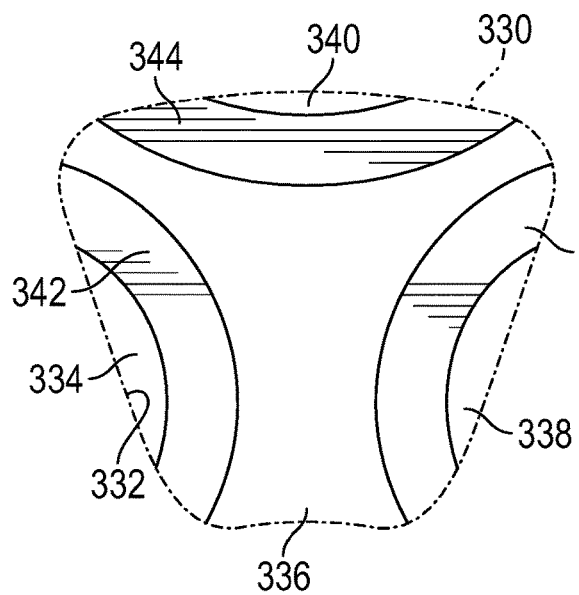

There is schematically illustrated in FIG. 19 a vent hole region 330 having a vent hole, indicated generally at 332, which is subdivided into smaller holes 334, 336, 338, and 340 by bridging portions 342, 344, and 346. The bridging portions 342, 344, and 336 each have a curved configuration stemming from different parts of the perimeter of the vent hole 332.

Figure 20:
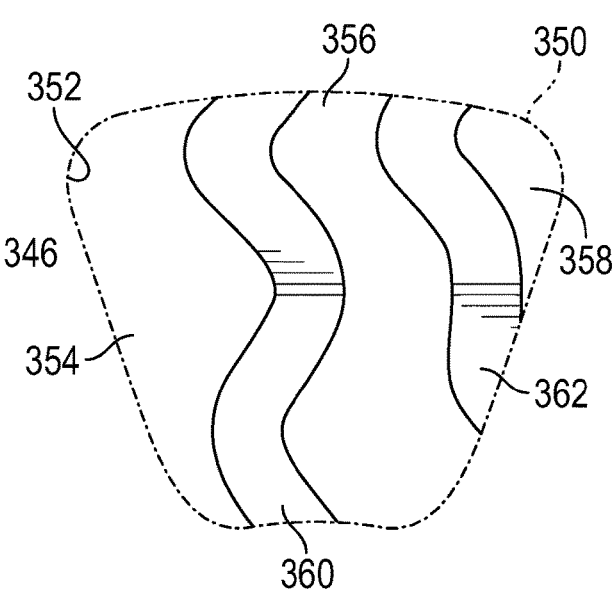

There is schematically illustrated in FIG. 20 a vent hole region 350 having a vent hole, indicated generally at 352, which is subdivided into smaller holes 354, 356, and 358 by bridging portions 360 and 362. The bridging portions 360 and 362 are formed having a wavy curved shape generally illustrating that bridging portions may have shape. Additionally, the vent hole 352 illustrates that the bridging portion and hole pattern need not be symmetrical but can have an "organic" or asymmetrical design.

Figure 21:
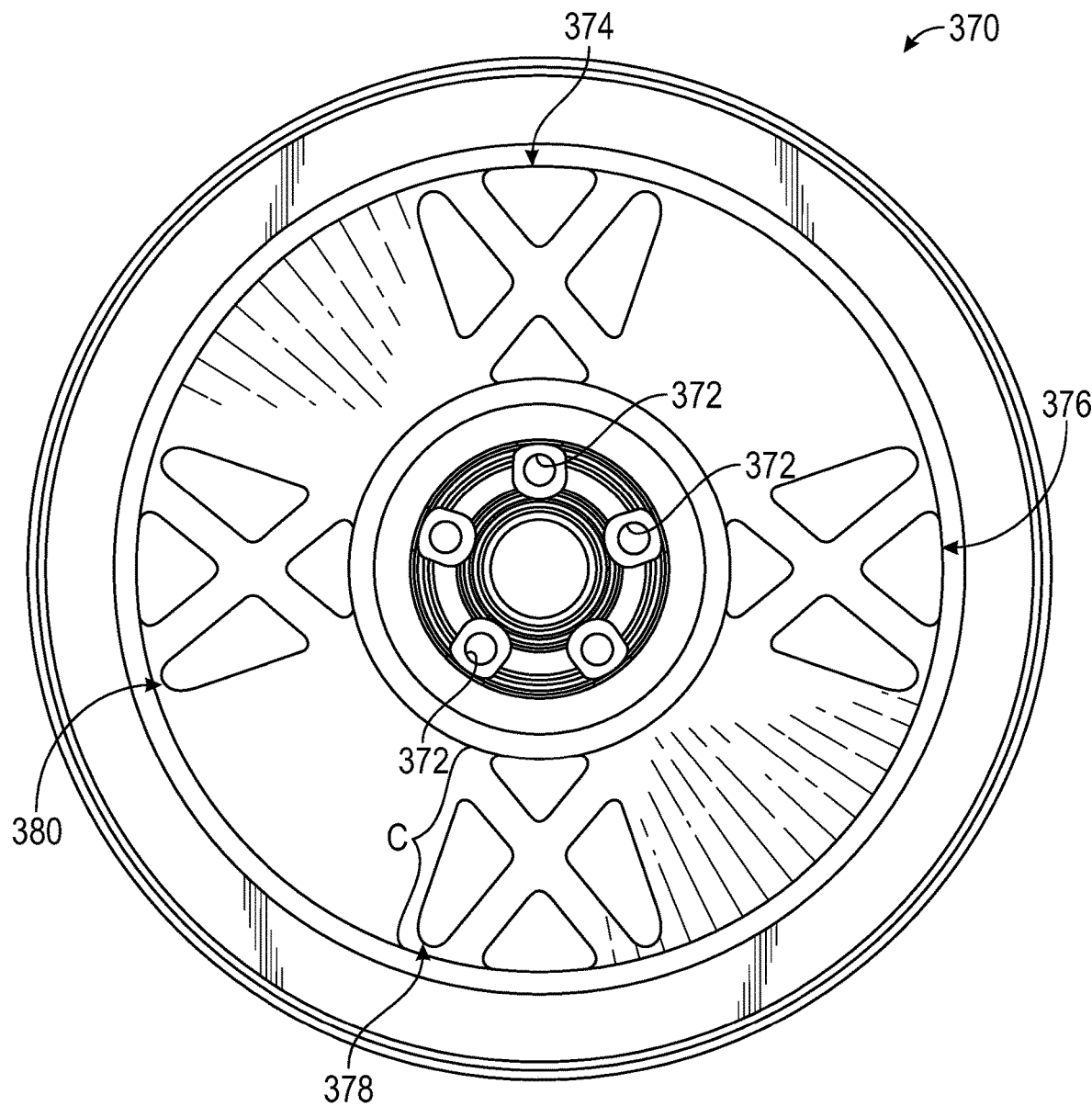
FIG. 21 is a front elevational view of an alternate embodiment of a vehicle wheel.

There is illustrated in FIG. 21 an alternate embodiment of a vehicle wheel, indicated generally at 370. It is noted that the wheel 370 has a five bolt hole pattern (lug bolt receiving holes 372) yet only has four vent hole regions, indicated generally at 374, 376, 378, and 380 circumferentially spaced about the wheel axis equidistant from one another. This embodiment provides an example wherein the number of vent hole regions need not be the same as the number of lug bolt receiving holes formed in the wheel disc. It is also noted that the vent hole regions 374, 376, 378, and 380 have a similar cross or X-shape configuration as the wheel disc 170 of FIG. 12 and also that the vent hole regions 374, 376, 378, and 380 extend through a "C" only segment of the transition portion in a similar arrangement.

Figure 22:
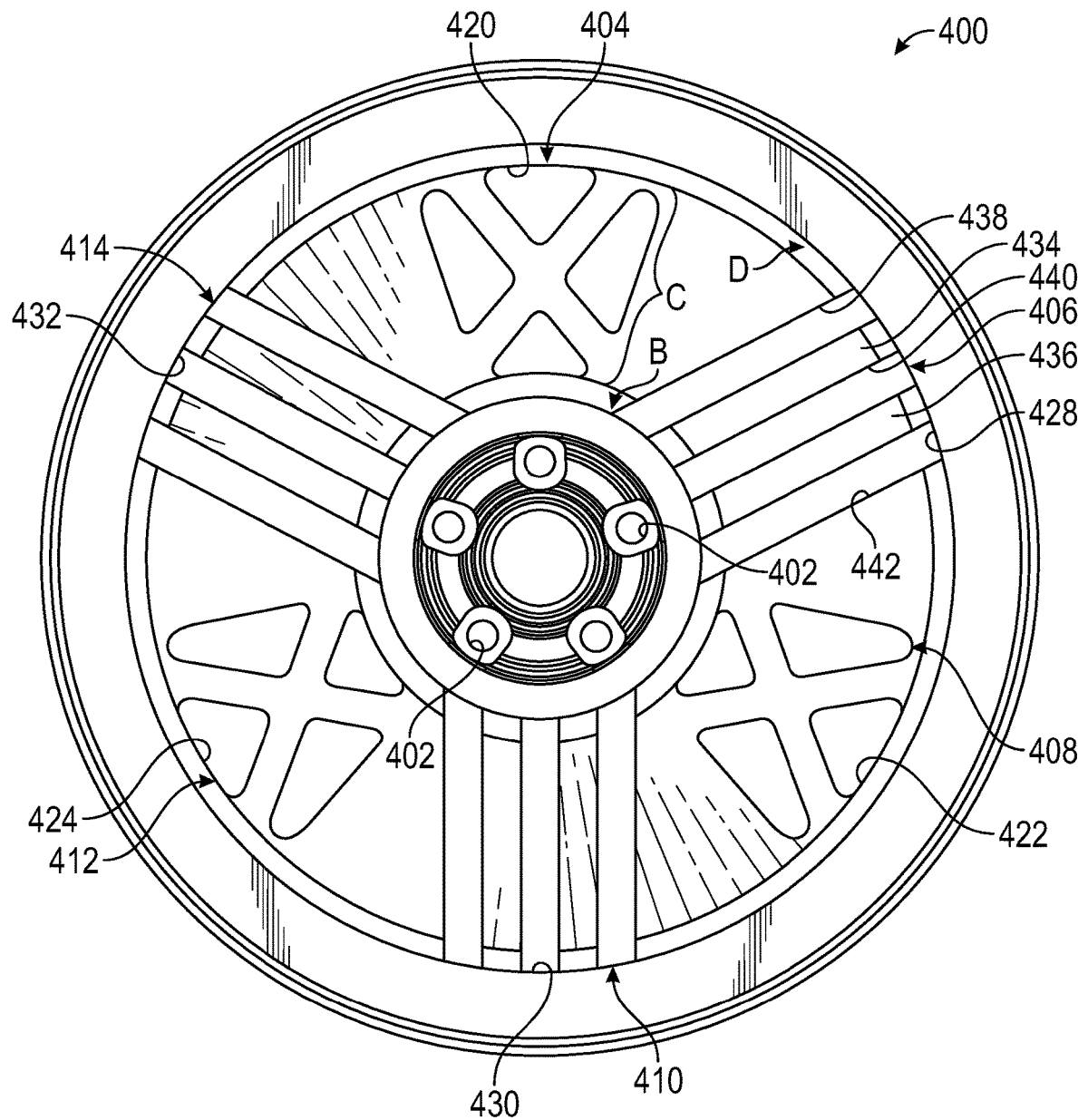
FIG. 22 is a front elevational view of another alternate embodiment of a vehicle wheel.

There is illustrated in FIG. 22 another alternate embodiment of vehicle wheel, indicated generally at 400. It is noted that the wheel 400 has a five bole hole pattern (lug bolt receiving holes 402) yet has six vent hole regions, indicated generally at 404, 406, 408, 410, 412, and 414 generally circumferentially spaced about the wheel axis equidistant from one another. This embodiment provides another example wherein the number of vent hole regions need not be the same as the number of lug bolt receiving holes formed in the wheel disc. The vent hole regions 404, 408, and 412 have similar vent holes 420, 422, and 424, respectively, which have a similar cross or X-shape configuration as the wheel disc 170 of FIG. 12 and also that the vent holes 420, 422, and 424 extend through a "C" only segment of the transition portion in a similar arrangement. The vent hole regions 406, 410, and 414 have a rectangular shaped configuration similar to the vent hole region 152 of the wheel disc 130 of FIG. 9. The vent hole regions 406, 410, and 414 have corresponding vent holes 428, 430, and 432 which extend through segments B, C, and D of the transition portion. The vent holes 428, 430, and 432 each have two straight bridging portions 434 and 436 subdividing the vent holes 428, 430, and 432 into smaller holes or slots 438, 440, and 442. This embodiment provides another example that all of the vent holes need not be or the same configuration.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A full face fabricated vehicle wheel comprising:
a wheel rim having a tire well and an inboard bead seat retaining flange, wherein the wheel rim defines an outboard bead seat and an inboard bead seat; and
a wheel disc configured to be secured to the wheel rim, wherein the wheel disc includes:
a hub located centrally within the wheel disc and defining a wheel axis, wherein the hub includes an axial hub hole and a plurality of lug bolt receiving holes formed therein such that the lug bolt receiving holes are spaced circumferentially about the hub hole equidistant from one another;
an outer circumferential edge having an outboard bead seat retaining flange; and
an annular transition portion radially extending between the hub and the outer circumferential edge, wherein the transition portion includes a plurality of vent hole regions circumferentially spaced around the transition portion about the wheel axis, and wherein at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region, wherein the transition portion is subdivided into a plurality of concentric segments.

2. The full face fabricated vehicle wheel of claim 1, wherein the wheel rim and the wheel disc are made of steel.

3. The full face fabricated vehicle wheel of claim 1, wherein the plurality of vent hole regions are circumferentially spaced equidistant from one another.

4. The full face fabricated vehicle wheel of claim 1, wherein each vent hole region includes an identically shaped vent hole having at least two bridging portions.

5. The full face fabricated vehicle wheel of claim 1, wherein a first number of the vent hole regions include a first vent hole, and wherein a second number of the vent hole regions include a second vent hole differently shaped than the first vent hole.

6. The full face fabricated vehicle wheel of claim 1, wherein the number of lug bolt receiving holes is equal to the number of vent hole regions.

7. The full face fabricated vehicle wheel of claim 6, wherein the vent hole regions are positioned radially adjacent to the lug bolt receiving holes.

8. The full face fabricated vehicle wheel of claim 1, wherein the bridging portions are curved, or wherein the bridging portions are straight.

9. The full face fabricated vehicle wheel of claim 1, wherein the at least one vent hole region includes a vent hole defining an outer perimeter such that two intersecting and crossing bridging portions extend inwardly from the perimeter forming an X-shape profile which subdivides the vent hole into four smaller holes formed through the transition portion at the at least one vent hole region.

10. The full face fabricated vehicle wheel of claim 1, wherein the at least one vent hole region includes a vent hole defining an outer perimeter such that two or more parallel spaced bridging portions subdivides the vent hole into smaller holes.

11. The full face fabricated vehicle wheel of claim 1, wherein the transition portion has an outboard surface and an inboard surface such that at least a portion of the transition portion has a variable thickness between the outboard and inboard surfaces along a radial direction.

12. The full face fabricated vehicle wheel of claim 11, wherein at least one of the outboard and inboard surfaces of the transition portion has a plurality of concentric ring-shaped curvatures formed therein, thereby providing the transition portion with a variable thickness between the inboard and outboard surfaces.

13. The full face fabricated vehicle wheel of claim 12, wherein one of the inboard and outboard surfaces of the transition portion has a relatively smooth profile.

14. The full face fabricated vehicle wheel of claim 12, wherein the concentric ring-shaped curvatures include undulations formed in at least one of the outboard and inboard surfaces.

15. The full face fabricated vehicle wheel of claim 14, wherein the undulations are formed as alternating convex and concave ring-shaped curves concentric about the wheel axis.

16. The full face fabricated vehicle wheel of claim 1, wherein the transition portion is divided into first, second, third, fourth, and fifth sequential segments extending radially outwardly from the wheel axis.

17. The full face fabricated vehicle wheel of claim 16, wherein the first segment includes anywhere from zero to three ring-shaped curvatures, the second segment includes anywhere from zero to two ring-shaped curvatures, the third segment includes anywhere from one to twenty ring-shaped curvatures, the fourth segment includes anywhere from zero to two ring-shaped curvatures, the fifth segment includes anywhere from zero to three ring-shaped curvatures.

18. The full face fabricated vehicle wheel of claim 16, wherein the first segment has a maximum thinning of 40% of a thickness of the hub, the second segment has a maximum thinning of 40% of the thickness of the hub, the third segment has a maximum thinning of 60% of the thickness of the hub, the fourth segment has a maximum thinning of 40% of the thickness of the hub, and/or the fifth segment has a maximum thinning of 60% of the thickness of the hub.

19. The full face fabricated vehicle wheel of claim 16, wherein at least the third segment includes undulations formed as alternating convex and concave ring- shaped curves concentric about the wheel axis in the inboard surface of the third segment.

20. The full face fabricated vehicle wheel of claim 16, wherein the first segment is adjacent an outer edge of the hub and has a frustoconical shape sloped at a first angle relative to the wheel axis.

21. The full face fabricated vehicle wheel of claim 20, wherein the third segment has a frustoconical shape sloped at a second angle relative to the wheel axis which is different from the first angle.

22. The full face fabricated vehicle wheel of claim 21, wherein the second segment joins the first and third segments together with a curvature that smoothly blends in with the first and third segments, and wherein the fourth segment joins the third and fifth segments together with a curvature that smoothly blends in with the third and fifth segments.

23. The full face fabricated vehicle wheel of claim 22, wherein an outboard surface of the fifth segment is generally planar and perpendicular to the wheel axis.

24. The full face fabricated vehicle wheel of claim 21, wherein the transition portion includes the vent hole regions in at least the third segment.

25. The full face fabricated vehicle wheel of claim 24, wherein the third segment has a radial length of between 50 percent to about 70 percent of the radial length of the transition portion.

26. The full face fabricated vehicle wheel of claim 22, wherein the transition portion further includes the vent hole regions in the first, second, or fourth segments.

27. The full face fabricated vehicle wheel of claim 24, wherein the fifth segment extends radially outwardly from the fourth segment to the outer circumferential edge of the wheel disc.

28. The full face fabricated vehicle wheel of claim 27 wherein the outer perimeter of the vent hole radially extends only in the third segment, or wherein the outer perimeter of the vent hole radially extends through the third and fourth segments, or wherein the outer perimeter of the vent hole radially extends through the second, third, fourth segments, or wherein the outer perimeter of the vent hole radially extends through the second and third segments.

29. A method of forming the wheel disc of claim 1, wherein the wheel disc is formed by a flow forming process.

30. A steel wheel disc comprising:
    a hub located centrally within the wheel disc and defining a wheel axis, wherein the hub includes an axial hub hole and a plurality of lug bolt receiving holes formed therein such that the lug bolt receiving holes are spaced circumferentially about the hub hole equidistant from one another;
    an outer circumferential edge; and
    an annular transition portion radially extending between the hub and the outer circumferential edge, wherein the transition portion includes a plurality of vent hole regions circumferentially spaced around the transition portion about the wheel axis, and wherein at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region, and wherein the transition portion is divided into first, second, third, fourth, and fifth sequential segments extending radially outwardly from the wheel axis, wherein the first segment is adjacent an outer edge of the hub and has a frustoconical shape sloped at a first angle relative to the wheel axis, and wherein the third segment has a frustoconical shape sloped at a second angle relative to the wheel axis which is different from the first angle, and wherein the second segment joins the first and third segments together with a curvature that smoothly blends in with the first and third segments, and wherein the fourth segment joins the third and fifth segments together with a curvature that smoothly blends in with the third and fifth segments, and wherein the fifth segment extends radially outwardly from the fourth segment to the outer circumferential edge of the wheel disc, and wherein the vent holes are formed only in the third segment.

31. A method of manufacturing a vehicle wheel disc including the steps of:
    (a) providing a metallic preform;
    (b) positioning the preform on a mandrel of a flow forming machine; and (c) flow forming the preform against the mandrel by a rolling tool to form a wheel disc having:
  a hub located centrally within the wheel disc and defining a wheel axis, wherein the hub includes an axial hub hole and a plurality of lug bolt receiving holes formed therein such that the lug bolt receiving holes are spaced circumferentially about the hub hole equidistant from one another;
  an outer circumferential edge having an outboard bead seat retaining flange; and
  an annular transition portion radially extending between the hub and the outer circumferential edge, wherein the transition portion includes a plurality of vent hole regions circumferentially spaced around the transition portion about the wheel axis, and wherein at least one vent hole region includes a vent hole formed through the transition portion and defining an outer perimeter such that at least two bridging portions extend inwardly from the perimeter which subdivides the vent hole into at least three smaller holes formed through the transition portion at the at least one vent hole region, wherein the transition portion is subdivided into a plurality of concentric segments.

32. The method of claim 31 including the step of forming a plurality of vent holes in the transition portion by a piercing, punching or cutting operation.

* * * * *